(12) United States Patent
Davoust et al.

(10) Patent No.: US 10,539,116 B2
(45) Date of Patent: Jan. 21, 2020

(54) SYSTEMS AND METHODS TO CORRECT INDUCTION FOR LIDAR-ASSISTED WIND TURBINE CONTROL

(71) Applicant: General Electric Company, Schenectady, NY (US)

(72) Inventors: Samuel Davoust, Garching (DE); Conner B. Shane, Niskayuna, NY (US); Fabiano Daher Adegas, Garching (DE); Thomas Stephen Markham, Niskayuna, NY (US); Dale Robert Mashtare, Greenville, SC (US)

(73) Assignee: General Electric Company, Schenectady, NY (US)

(*) Notice: Subject to any disclaimer, the term of this patent is extended or adjusted under 35 U.S.C. 154(b) by 634 days.

(21) Appl. No.: 15/208,723

(22) Filed: Jul. 13, 2016

(65) Prior Publication Data
US 2018/0017039 A1    Jan. 18, 2018

(51) Int. Cl.
*F03D 7/02* (2006.01)
*F03D 7/04* (2006.01)
(Continued)

(52) U.S. Cl.
CPC ......... *F03D 7/0204* (2013.01); *F03D 7/0224* (2013.01); *F03D 7/04* (2013.01);
(Continued)

(58) Field of Classification Search
CPC .... F03D 7/0204; F03D 7/0224; F03D 7/0208; F03D 7/04; F03D 7/045; F03D 7/047;
(Continued)

(56) References Cited

U.S. PATENT DOCUMENTS

| 4,298,313 A | 11/1981 | Hohenemser et al. |
| 4,420,692 A | 12/1983 | Kos et al. |

(Continued)

FOREIGN PATENT DOCUMENTS

| CN | 102725520 A | 10/2012 |
| CN | 103061980 A | 4/2013 |

(Continued)

OTHER PUBLICATIONS

Smiley et al. (NPL Document) "Investigation of the Impact of the Upstream Induction Zone on LIDAR Measurement Accuracy for Wind Turbine Control Applications using Large-Eddy Simulations", Journal of Physics.: Conf. Ser. 524 (2014) 012003 (Year: 2014).*

(Continued)

*Primary Examiner* — Brian P Wolcott
(74) *Attorney, Agent, or Firm* — Armstrong Teasdale LLP

(57) ABSTRACT

Methods, apparatus, systems and articles of manufacture are disclosed to provide wind turbine control and compensate for wind induction effects. An example method includes receiving wind speed data from a Light Detecting and Ranging (LIDAR) sensor. The example method includes receiving operating data indicative of wind turbine operation. The example method includes determining an apriori induction correction for wind turbine operating conditions with respect to the LIDAR wind speed data based on the operating data. The example method includes estimating a wind signal from the LIDAR sensor that is adjusted by the correction. The example method includes generating a control signal for a wind turbine based on the adjusted LIDAR estimated wind signal.

17 Claims, 16 Drawing Sheets

(51) Int. Cl.
*G01S 17/58* (2006.01)
*G01S 17/95* (2006.01)

(52) U.S. Cl.
CPC ............. *G01S 17/58* (2013.01); *G01S 17/95* (2013.01); *F05B 2220/30* (2013.01); *F05B 2260/84* (2013.01); *F05B 2270/20* (2013.01); *F05B 2270/32* (2013.01); *F05B 2270/404* (2013.01); *F05B 2270/8042* (2013.01)

(58) Field of Classification Search
CPC ...... F03D 7/0276; F03D 7/028; F03D 7/0264; F05B 2260/84; F05B 2270/8042; F05B 2270/404
See application file for complete search history.

(56) References Cited

U.S. PATENT DOCUMENTS

| | | | |
|---|---|---|---|
| 5,048,285 A | 9/1991 | Schmitt et al. | |
| 5,359,888 A | 11/1994 | Hagen | |
| 6,320,272 B1 | 11/2001 | Lading et al. | |
| 6,361,275 B1 | 3/2002 | Wobben | |
| 6,940,186 B2 | 9/2005 | Weitkamp | |
| 6,946,751 B2 | 9/2005 | Yoshida et al. | |
| 7,025,567 B2 | 4/2006 | Wobben | |
| 7,175,389 B2 | 2/2007 | Moroz | |
| 7,244,100 B2 | 7/2007 | Yoshida | |
| 7,281,891 B2 | 10/2007 | Smith et al. | |
| 7,342,323 B2* | 3/2008 | Avagliano | F03D 7/0224 290/55 |
| 7,372,173 B2 | 5/2008 | Lutze et al. | |
| 7,379,169 B1 | 5/2008 | Kraemer et al. | |
| 7,391,506 B2 | 6/2008 | Harris et al. | |
| 7,942,629 B2 | 5/2011 | Shi et al. | |
| 7,950,901 B2 | 5/2011 | Barbu et al. | |
| 7,952,215 B2 | 5/2011 | Hayashi et al. | |
| 7,999,406 B2 | 8/2011 | Cardinal et al. | |
| 8,025,476 B2 | 9/2011 | Zheng et al. | |
| 8,076,789 B2 | 12/2011 | Miller | |
| 8,105,029 B2 | 1/2012 | Egedal et al. | |
| 8,155,064 B2 | 4/2012 | Harada et al. | |
| 8,167,555 B2 | 5/2012 | Yoshida | |
| 8,178,989 B2 | 5/2012 | Haag et al. | |
| 8,202,049 B2 | 6/2012 | Rogers et al. | |
| 8,267,654 B2 | 9/2012 | van Dam et al. | |
| 8,362,632 B2 | 1/2013 | Nielsen et al. | |
| 8,365,005 B2 | 1/2013 | Bengtson et al. | |
| 8,390,791 B2 | 3/2013 | Vert et al. | |
| 8,450,867 B2 | 5/2013 | Fukami et al. | |
| 8,461,707 B2 | 6/2013 | Fujino et al. | |
| 8,500,624 B2 | 8/2013 | Chu | |
| 8,527,453 B2 | 9/2013 | Garate Alvaro | |
| 8,529,206 B2 | 9/2013 | Numajiri | |
| 8,557,509 B2 | 11/2013 | Ong et al. | |
| 8,669,426 B1 | 3/2014 | Corbin et al. | |
| 8,694,173 B2 | 4/2014 | Lovmand et al. | |
| 8,704,390 B2 | 4/2014 | Haj-Maharsi et al. | |
| 8,793,027 B2 | 7/2014 | Nyborg et al. | |
| 8,907,511 B2* | 12/2014 | Bowyer | F03D 7/028 290/44 |
| 8,915,709 B2 | 12/2014 | Westergaard | |
| 8,928,164 B2* | 1/2015 | Bowyer | F03D 7/0276 290/44 |
| 9,109,576 B2 | 8/2015 | Westergaard et al. | |
| 9,188,104 B2* | 11/2015 | Bowyer | F03D 7/0284 |
| 9,217,413 B2 | 12/2015 | Olesen | |
| 9,366,230 B2 | 6/2016 | Perley et al. | |
| 2004/0183307 A1 | 9/2004 | Yoshida et al. | |
| 2004/0258521 A1 | 12/2004 | Wobben | |
| 2005/0169755 A1 | 8/2005 | Yoshida | |
| 2005/0209713 A1 | 9/2005 | Fuller | |
| 2006/0002791 A1 | 1/2006 | Moroz | |
| 2006/0140764 A1 | 6/2006 | Smith et al. | |
| 2007/0047163 A1 | 3/2007 | Lutze et al. | |
| 2007/0067067 A1* | 3/2007 | Stommel | F03D 7/0224 700/287 |
| 2007/0075546 A1 | 4/2007 | Avagliano et al. | |
| 2007/0124025 A1 | 5/2007 | Schram et al. | |
| 2007/0171396 A1 | 7/2007 | Harris et al. | |
| 2009/0039651 A1 | 2/2009 | Stiesdal | |
| 2009/0047116 A1 | 2/2009 | Barbu et al. | |
| 2009/0047129 A1 | 2/2009 | Yoshida | |
| 2009/0218818 A1 | 9/2009 | Cardinal et al. | |
| 2009/0257873 A1 | 10/2009 | Egedal et al. | |
| 2009/0263245 A1 | 10/2009 | Shi et al. | |
| 2009/0285682 A1 | 11/2009 | Baker et al. | |
| 2010/0066087 A1 | 3/2010 | Hayashi et al. | |
| 2010/0135789 A1 | 6/2010 | Zheng et al. | |
| 2010/0140936 A1 | 6/2010 | Benito et al. | |
| 2010/0195089 A1 | 8/2010 | Wu et al. | |
| 2010/0268849 A1 | 10/2010 | Bengtson et al. | |
| 2010/0286835 A1 | 11/2010 | Nyborg et al. | |
| 2010/0301604 A1 | 12/2010 | Nielsen et al. | |
| 2010/0329842 A1 | 12/2010 | Stiesdal | |
| 2010/0332272 A1 | 12/2010 | Ong et al. | |
| 2011/0018271 A1 | 1/2011 | Karikomi et al. | |
| 2011/0101691 A1 | 5/2011 | Hashimoto et al. | |
| 2011/0106324 A1 | 5/2011 | Tsadka et al. | |
| 2011/0127772 A1 | 6/2011 | Fukami et al. | |
| 2011/0128524 A1 | 6/2011 | Vert et al. | |
| 2011/0182712 A1 | 7/2011 | Nayebi et al. | |
| 2011/0204635 A1 | 8/2011 | Miller | |
| 2011/0210549 A1 | 9/2011 | Haag et al. | |
| 2011/0216307 A1 | 9/2011 | Belen et al. | |
| 2011/0224926 A1 | 9/2011 | Morjaria et al. | |
| 2011/0280725 A1 | 11/2011 | Taylor et al. | |
| 2011/0295438 A1 | 12/2011 | Rogers et al. | |
| 2011/0301769 A1 | 12/2011 | Lovmand et al. | |
| 2012/0009062 A1 | 1/2012 | Ingram et al. | |
| 2012/0010864 A1 | 1/2012 | Taber, Jr. | |
| 2012/0051907 A1 | 3/2012 | Rogers et al. | |
| 2012/0056426 A1 | 3/2012 | Van et al. | |
| 2012/0059638 A1 | 3/2012 | Garate | |
| 2012/0128488 A1 | 5/2012 | Kristoffersen | |
| 2012/0139241 A1 | 6/2012 | Haj et al. | |
| 2012/0303277 A1 | 11/2012 | Fu et al. | |
| 2012/0318057 A1 | 12/2012 | Olesen | |
| 2013/0003071 A1 | 1/2013 | Mamidipudi et al. | |
| 2013/0029708 A1 | 1/2013 | Fox et al. | |
| 2013/0033040 A1 | 2/2013 | Bowyer et al. | |
| 2013/0062880 A1 | 3/2013 | Bowyer et al. | |
| 2013/0088009 A1 | 4/2013 | Coineau et al. | |
| 2013/0094961 A1* | 4/2013 | Couchman | F03D 7/042 416/1 |
| 2013/0099494 A1 | 4/2013 | Numajiri et al. | |
| 2013/0115082 A1 | 5/2013 | Rogers et al. | |
| 2013/0134711 A1 | 5/2013 | Spruce | |
| 2013/0161956 A1 | 6/2013 | Evans | |
| 2013/0259686 A1 | 10/2013 | Blom et al. | |
| 2013/0297085 A1 | 11/2013 | Xiongzhe et al. | |
| 2014/0028496 A1 | 1/2014 | Schroeder et al. | |
| 2014/0030089 A1 | 1/2014 | Wickstroem | |
| 2014/0035285 A1 | 2/2014 | Creaby et al. | |
| 2014/0070538 A1 | 3/2014 | Bowyer et al. | |
| 2014/0103653 A1 | 4/2014 | Ubben et al. | |
| 2014/0140843 A1 | 5/2014 | Spruce et al. | |
| 2014/0145439 A1 | 5/2014 | Burra et al. | |
| 2014/0152010 A1 | 6/2014 | Larsen et al. | |
| 2014/0169964 A1 | 6/2014 | Kumar et al. | |
| 2014/0207296 A1 | 7/2014 | Kjar et al. | |
| 2014/0219795 A1 | 8/2014 | Honhoff et al. | |
| 2014/0232198 A1 | 8/2014 | Garcia et al. | |
| 2014/0328678 A1 | 11/2014 | Guadayol Roig | |
| 2014/0334927 A1 | 11/2014 | Hammerum | |
| 2014/0339829 A1 | 11/2014 | Doan | |
| 2015/0056072 A1 | 2/2015 | Perley et al. | |
| 2015/0086362 A1 | 3/2015 | Fu et al. | |
| 2015/0125297 A1 | 5/2015 | Bahuguni et al. | |
| 2015/0132128 A1 | 5/2015 | Zaib et al. | |
| 2015/0145253 A1 | 5/2015 | Bayon et al. | |
| 2015/0233349 A1 | 8/2015 | Pericleo | |

(56) References Cited

U.S. PATENT DOCUMENTS

| | | | |
|---|---|---|---|
| 2015/0249338 A1 | 9/2015 | Nelson et al. | |
| 2015/0330363 A1 | 11/2015 | Kruger et al. | |
| 2017/0167470 A1 | 6/2017 | Markham et al. | |

FOREIGN PATENT DOCUMENTS

| | | |
|---|---|---|
| CN | 103573552 B | 2/2016 |
| EP | 2626551 A2 | 8/2013 |
| GB | 2 476 316 A | 6/2011 |
| GB | 2476507 A | 6/2011 |
| GB | 2 481 789 A | 1/2012 |
| NI | 2005400 C | 3/2012 |
| WO | 2005/090781 A1 | 9/2005 |
| WO | 2010086631 A2 | 8/2010 |
| WO | 2010106322 A2 | 9/2010 |
| WO | 2011076818 A2 | 6/2011 |
| WO | 2011076875 A2 | 6/2011 |
| WO | 2011/150942 A1 | 12/2011 |
| WO | 2011/160634 A1 | 12/2011 |
| WO | 2011161434 A2 | 12/2011 |
| WO | 2012003841 A2 | 1/2012 |
| WO | 2012044161 A2 | 4/2012 |
| WO | 201208910 A1 | 7/2012 |
| WO | 2012097814 A1 | 7/2012 |
| WO | 2012103668 A1 | 8/2012 |
| WO | 2012146258 A1 | 11/2012 |
| WO | 2012149940 A1 | 11/2012 |
| WO | 2012152280 A1 | 11/2012 |
| WO | 2013004252 A2 | 1/2013 |
| WO | 2013023702 A1 | 2/2013 |
| WO | 2013083139 A2 | 6/2013 |
| WO | 2013091642 A1 | 6/2013 |
| WO | 2013182200 A1 | 12/2013 |
| WO | 2014053136 A1 | 4/2014 |
| WO | 2014056633 A1 | 4/2014 |
| WO | 2014090255 A1 | 6/2014 |

OTHER PUBLICATIONS

Henriksen et al., "A Simplified Dynamic Inflow Model and its Effect on the Performance of Free Mean Wind Speed Estimation", Wind Energ, pp. 1213-1224, 2013.

Akon, "Measurement of Axial Induction Factor for a Model Wind Turbine", A thesis submitted to the College of Graduate Studies and Research in partial fulfillment of the requirements for the degree of Master of Science in the Department of Mechanical Engineering University of Saskatchewan, Aug. 2012, 116 pages.

Dunne et al., "Importance of Lidar Measurement Timing Accuracy for Wind Turbine Control", American Control Conference, Jun. 2014, 6 pages.

Sathe et al., "Influence of atmospheric stability on wind turbine loads",Wind Energy, 2012, 24 pages.

Kragh et al., "Improving Yaw Alignment Using Spinner Based Lidar", 49th AIAA Aerospace Sciences Meeting including the New Horizons Forum and Aerospace Exposition Jan. 4-7, 2011, Orlando, Florida, 13 pages.

Laks et al., "Model Predictive Control Using Preview Measurements From Lidar", 49th AIAA Aerospace Sciences Meeting including the New Horizons Forum and Aerospace Exposition Jan. 4-7, 2011, Orlando, Florida, 20 pages.

Mandag, "Full Two-Dimensional Rotor Plane Inflow Measured by a Combined Blade and Spinner-Integrated Wind Lidar System", retrieved from http://www.vindenergi.dtu.dk, last visited Jul. 8, 2016, 4 pages.

"Vestas selects HCL Technologies as Strategic Partner", HCL Technologies Ltd., Jun. 21, 2013, 2 pages.

Schlipf et al., "An Adaptive Data Processing Technique for Lidar-Assisted Control to Bridge the Gap between Lidar Systems and Wind Turbines", Presented at the EWEA 2015 Annual Event Paris, France Nov. 17-20, 2015, 7 pages.

"About Wind Measurement," Retrieved from Internet URL: https://www.zephirlidar.com/about/, pp. 1-4 (May 4, 2018).

"Greater safety in aviation—detecting turbulence in advance," Retrieved from Internet URL: http://www.dlr.de/dlr/presse/en/desktopdefault.aspx/tabid-10307/470_read-7615/year-all/#/gallery/11637, on May 7, 2018, pp. 1-2 (Aug. 5, 2013).

"Introducing Adaptive Airfoil from Danfoss PolyPower," Retrieved from Internet URL: https://www.youtube.com/watch?v=6D_YxwY4TeM&feature=youtu.be, on May 7, 2018, pp. 1-3 (May 27, 2010).

"Leosphere Lidar wind measurement assessment aerosol windshear detection," Retrieved from Internet URL: http://www.leosphere.com/en/, pp. 1-2 (May 7, 2018).

"Our Services—Natural Power," Retrieved from Internet URL: https://www.naturalpower.com/our-services/, pp. 1-4 (May 7, 2018).

"Products Archive-ZephIR Lidar," Retrieved from Internet URL: https://www.zephirlidar.com/products/, p. 1 (May 7, 2018).

"ZephIR DM—Turbine Mounted Wind Lidar," Retrieved from Internet URL: https://www.zephirlidar.com/products/zephir-dm/, pp. 1-4 (May 7, 2018).

Courtney, M., et al., "Testing and comparison of lidars for profile and turbulence measurements in wind energy," 14th International Symposium for the Advancement of Boundary Layer Remote Sensing, IOP Conf. Series: Earth and Environmental Science 1, pp. 1-14 (2008).

Mikkelsen, et al., "A spinner-integrated wind lidar for enhanced wind turbine control," Wind Energy, pp. 625-643 (Oct. 16, 2012).

Staff, N., "LIDAR Provider Captures Simultaneous Upwind, Downwind Measurements," Retrieved from Internet URL: https://nawindpower.com/lidar-provider-captures-simultaneous-upwind-downwind-measurements, on May 7, 2018, p. 1 (May 17, 2013).

Thummala, P., et al., "Analysis of Dielectric Electro Active Polymer Actuator and its High Voltage Driving Circuits," IEEE International on Power Modulator and High Voltage Conference (IPMHVC), pp. 1-4 (Jun. 3-7, 2012).

Peter Fogh Odgaard et al., "Importance of Dynamic Inflow in Model Predictive Control of Wind Turbines", ScienceDirect IFAC-PapersOnLine 48-30, 2015, pp. 090-095.

\* cited by examiner

SYSTEMS AND METHODS TO CORRECT INDUCTION FOR LIDAR-ASSISTED WIND TURBINE CONTROL

FIELD OF THE DISCLOSURE

This disclosure relates generally to wind turbine control, and, more particularly, to methods and apparatus to correct rotor induction for Light Detection and Ranging (LIDAR)-assisted wind turbine control.

BACKGROUND

Wind power is considered to be one of the cleanest, most environmentally friendly energy sources presently available, and wind turbines have gained increased attention for at least these reasons. Wind turbines have received increased attention over the past couple of decades as an environmentally clean energy source that is not dependent on limited fossil fuels.

BRIEF SUMMARY

Certain examples provide systems and methods to control a wind turbine and compensate for wind induction effects.

Certain examples provide a method of controlling a wind turbine. The example method includes receiving wind speed data from a Light Detecting and Ranging (LIDAR, Lidar, or lidar) sensor. The example method includes receiving operating data indicative of wind turbine operation. The example method includes determining an apriori induction correction for wind turbine operating conditions with respect to the LIDAR wind speed data based on the operating data. The example method includes estimating a wind signal from the LIDAR sensor that is adjusted by the correction. The example method includes generating a control signal for a wind turbine based on the adjusted LIDAR estimated wind signal.

Certain examples provide a tangible, computer-readable storage medium including instructions which, when executed by a processor, cause the processor to at least receive wind speed data from a Light Detecting and Ranging (LIDAR) sensor. Additionally, the example instructions, when executed, cause the processor to at least receive operating data indicative of wind turbine operation. The example instructions, when executed, cause the processor to at least determine an apriori induction correction for wind turbine operating conditions with respect to the LIDAR wind speed data based on the operating data. The example instructions, when executed, cause the processor to at least estimate a wind signal from the LIDAR sensor that is adjusted by the correction. The example instructions, when executed, cause the processor to at least generate a control signal for a wind turbine based on the adjusted LIDAR estimated wind signal.

Certain examples provide a wind turbine control apparatus. The example apparatus includes a wind estimation processor. The example wind estimation processor is particularly configured to receive wind speed data from a Light Detecting and Ranging (LIDAR) sensor. The example wind estimation processor is also particularly configured to receive operating data indicative of wind turbine operation. The example wind estimation processor is particularly configured to determine an apriori induction correction for wind turbine operating conditions with respect to the LIDAR wind speed data based on the operating data. The example wind estimation processor is particularly configured to estimate a wind signal from the LIDAR sensor that is adjusted by the correction. The example wind estimation processor is particularly configured to generate a control signal for a wind turbine controller based on the adjusted LIDAR estimated wind signal.

DETAILED DESCRIPTION

Figure 1:
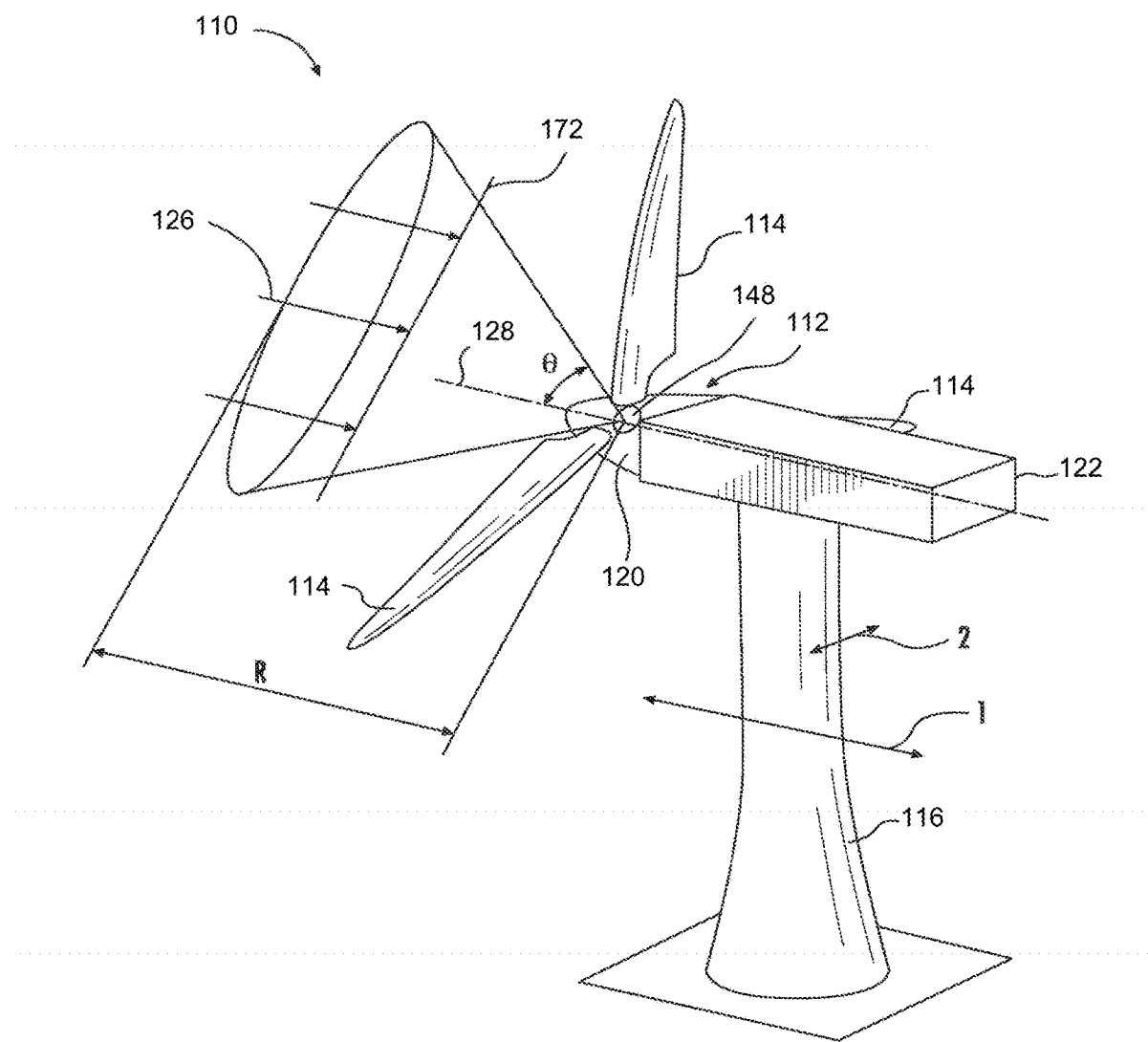
FIG. 1 illustrates an example wind turbine.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain examples provide systems and methods to control operation of a wind turbine according to measurements obtained with respect to the wind and wind turbine operation. A modern wind turbine typically includes a tower, a generator, a gearbox, a nacelle, and a rotor. The rotor typically includes a rotatable hub having one or more blades attached thereto. A pitch bearing is typically configured operably between the hub and the rotor blade to allow for rotation about a pitch axis. The rotor blades capture the kinetic energy of wind using known airfoil principles. The rotor blades transmit the kinetic energy as rotational energy to turn a shaft, which couples the rotor blades to a gearbox. Alternatively, if the gearbox is not used, the rotor blades transmit the kinetic energy directly to the generator. The generator then converts the mechanical energy into electrical energy that may be deployed to a utility grid, for example.

Changes in atmospheric conditions, such as wind speed, turbulence, wind gusts, wind direction, and wind density, can affect power produced by the generator. A power output of the generator increases with the wind speed until the wind speed reaches a threshold wind speed for the wind turbine. At the threshold wind speed, the generator operates at a rated power. The rated power is an output power, which the generator can operate with a level of fatigue or extreme load two-turbine components that have been predetermined to be acceptable for the turbine. At wind speeds higher than the threshold, typically referred to as a "trip limit" or "monitor set point limit," the wind turbine may implement a control action, such as shutting down or de-rating the wind turbine to protect wind turbine components from damage.

One or more sensors can be positioned on or near the wind turbine to detect wind conditions. For example, a wind speed sensor position on the wind turbine will measure wind gusts at substantially the same time as the wind gust strikes the rotor blades. As such, wind turbine operation adjustments are subject to a time lag between measurement of the wind gust and the control action. As a result, the wind gust may cause rotor acceleration that can create excessive turbine loading and fatigue. In some instances, the wind gust may cause the rotor speed or power output to exceed a trip limit before a wind turbine operation adjustment can be completed, thereby causing the wind turbine to shut down.

Upwind measuring sensors, such as light detection and ranging (LIDAR) sensors, can be used to address a time lag between measurement of the wind gusts and the control action. Using upwind measurement sensors, a change in wind acceleration can be measured upwind from the wind turbine, and the control action can be preemptively adjusted to compensate for the change in wind speed once the wind reaches the wind turbine.

LIDAR is a surveying technology that measures distance and speed by illuminating a target with a laser light. LIDAR emits laser and/or three-dimensional scanning, which is reflected onto one or several targets. LIDAR can also be used to measure airflow, such as wind, by the reflection of the emitted light by particles present in the atmosphere and carried by the wind. For example, a Doppler LIDAR system can be used to acquire wind speed, turbulence, wind veer, wind shear, and/or other wind profile data. Both pulsed and continuous wave Doppler LIDAR systems can be used. Pulsed Doppler LIDAR systems use signal timing to obtain distance resolution, and continuous wave Doppler LIDAR systems rely on detector focusing.

In certain examples, the turbine control architecture includes feed-forward and/or feedback components using upwind speed measurements and/or wind speed measurements at the turbine site, respectively. The turbine control systems combine feed-forward components based on the upwind speed measurements and feedback components based on the wind speed measured at the turbine site. Prediction and analysis of wind speed, using techniques such as a LIDAR-based analysis, can help achieve high-performance turbine operation.

Certain examples provide systems and methods to help prevent excessive loading from acting on wind turbine by detecting a wind condition before it reaches the wind turbine and implementing a corresponding corrective action. More specifically, one or more sensors may be used to detect an actual wind parameter upwind of the wind turbine. For example, one or more LIDAR sensors can be used to detect the actual wind parameter, such as a wind gust, the wind speed, wind direction, wind acceleration, wind turbulence, a wind shear, a wind veer, a wake, etc. Further, operating data indicative of current wind turbine operation is also provided to a processor to determine an estimated wind turbine condition. The wind turbine operating data can include, for example, wind turbine thrust, generator speed, torque, turbine blade pitch, etc.

Wind Turbine Examples

Referring now to the drawings, FIG. 1 illustrates an example of wind turbine 100. The example wind turbine 100 includes a rotor 112 having a plurality of blades 114 mounted on a hub 120. The wind turbine 100 also includes a nacelle 122 that is mounted on a tower 116. The rotor 112 is operatively coupled to an electrical generator via a drive-train (not shown) housed within the nacelle 122. The tower 116 exposes the blades 114 to the wind (directionally represented by an arrow 126), which causes the blades 114 to rotate about an axis 128. The blades 114 transform kinetic energy of the wind into a rotational torque, which is further transformed into electrical energy via the electrical generator.

Figure 2:
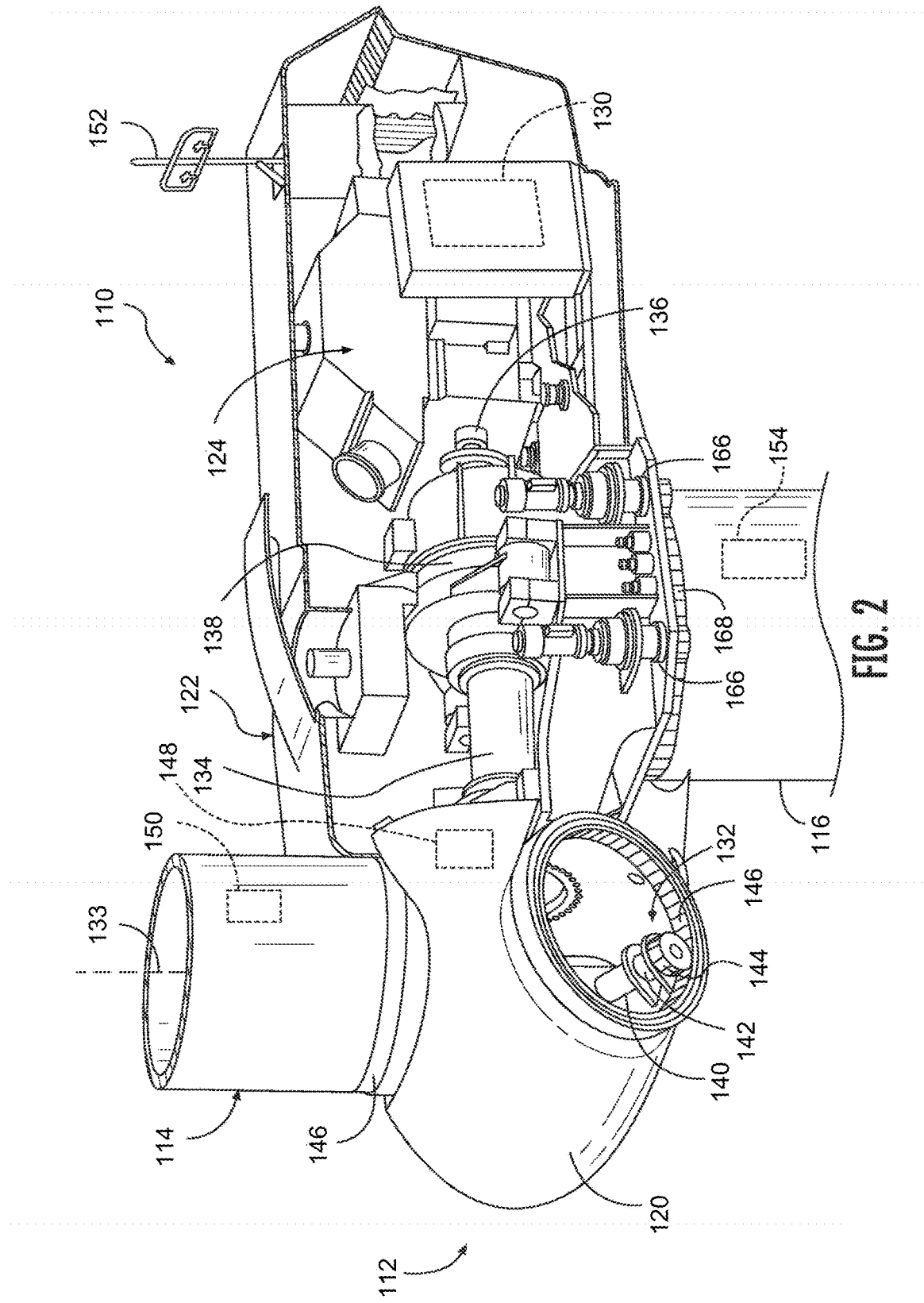
FIG. 2 shows a simplified, internal view of an implementation of the example wind turbine of FIG. 1.

A simplified, internal view of an implementation of the example wind turbine 100 is illustrated in FIG. 2. As shown in the example of FIG. 2, a generator 124 may be disposed within the nacelle 122. The generator 124 can be coupled to the rotor 112 to produce electric power from the rotational energy generated by the rotor 112. For example, as shown in FIG. 2, the rotor 112 can include a rotor shaft 134 for rotation therewith. The rotor shaft 134 may, in turn, be rotatably coupled to a generator shaft 136 of the generator 124 through a gearbox 138. The rotor shaft 134 can provide a low-speed, high-torque input to the gearbox 138 in response to rotation of the rotor blades 114 and a hub 120. The gearbox 138 may then be configured to convert the low-speed, high-torque input to a high-speed, low-torque output to drive the generator shaft 136 and the generator 124.

The wind turbine 100 may also include a controller 130 centralized within the nacelle 122. Alternatively, the controller 130 may be located within any other component of the wind turbine 100 or at a location outside the wind turbine 100. Further, the controller 130 may be communicatively coupled to one or more components of the wind turbine 100 in order to control operation of the component(s) and/or implement various correction actions as described herein. As such, the example controller 130 can include a computer and/or other processing unit. Thus, the controller 130 can include computer-readable instructions that, when implemented, configure the controller 130 to perform various functions, such as receiving, transmitting, and/or executing wind turbine control signals. Accordingly, the controller 130 can be configured to control the operating modes (e.g., startup and/or shutdown sequences, etc.), de-rate the wind turbine, and/or control components of the wind turbine 100.

As shown in the example of FIG. 2, each rotor blade 114 can also include a pitch adjustment mechanism 132 configured to rotate each rotor blade 114 about its pitch axis 133. Further, each pitch adjustment mechanism may include a pitch drive motor 140 (e.g., any suitable electric, hydraulic, or pneumatic motor, etc.), a pitch drive gearbox 142, and a pitch drive pinion 144. In such examples, the pitch drive motor 140 can be coupled to the pitch drive gearbox 142 so that the pitch drive motor 140 imparts mechanical force to the pitch drive gearbox 142. Similarly, the pitch drive gearbox 142 may be coupled to the pitch drive pinion 144 for rotation with the pitch drive pinion 144. The pitch drive pinion 144 can, in turn, begin rotational engagement with a pitch bearing 146 coupled between the hub 120 and a corresponding rotor blade 114 such that rotation of the pitch drive pinion 144 causes rotation of the pitch bearing 146. Thus, in such examples, rotation of the pitch drive motor 140 drives the pitch drive gearbox 142 and the pitch drive pinion 144, thereby rotating the pitch bearing 146 and the rotor blade 114 about a pitch axis 133. Similarly, the wind turbine 110 includes one or more yaw drive mechanisms 166 communicatively coupled to the controller 130, with each yard drive mechanism(s) 166 configured to change an angle of the nacelle 122 relative to the wind (e.g., by engaging a yaw bearing 168 of the wind turbine 100).

Referring to FIGS. 1-2, the example wind turbine 100 can include one or more sensors 148, 150, 152, 154 for measuring wind parameters upwind of the wind turbine 100. For example, as shown in FIG. 1, the sensor 148 is located on the hub 120 to measure actual wind parameters upwind of the wind turbine 100. The actual wind parameter can include a wind gust, a wind speed, a wind direction, a wind acceleration, a wind turbulence, a wind shear, a wind veer, etc. Further, the one or more sensors 148-154 can include at least one LIDAR sensor to measure upwind parameters. For example, as shown in FIG. 1, LIDAR sensor 148 is a measurement light detection and ranging device configured to scan an annular region around the wind turbine 100 and measure wind speed based upon reflection and/or scattering of light transmitted by the LIDAR sensor 148 from aerosol. A cone angle ($\theta$) and a range (R) of the LIDAR sensor 148 can be suitably selected to provide a desired accuracy of measurements as well as an acceptable sensitivity. In the illustrated example of FIG. 1, the LIDAR sensor 148 is located on the hub 120 on which the blades 114 are mounted. In other examples, one or more LIDAR sensors can also be located near the base of the wind turbine tower 116, on one or more of the wind turbine blades 114, on the nacelle 122, on the tower 116, and/or at any other suitable location. In other examples, the LIDAR sensor 148 may be located in any suitable location on or near the wind turbine 100. Further, the LIDAR sensor 148 can be configured to measuring wind parameter ahead of at least one specific portion of the wind turbine 100, such as a section of the blades 114 contributing to aerodynamic torque on the blades 114 (e.g., sections close to a tip of the blades 114). In the case of the points ahead of the blades 114 at which wind speed is measured by the LIDAR sensor 148, these examples are represented by a plane 172 shown in FIG. 1.

In other examples, one or more of the sensors 148-154 can be other sensors capable of measuring wind parameters upwind of the wind turbine 100. For example, the sensors 148-154 can include accelerometers, pressure sensors, angle of attack sensors, vibration sensors, miniaturized inertial measurement unit (MIMU) sensors, cameras, fiber optic systems, anemometers, wind vanes, sonic detection and ranging (SODAR) sensors, radio detection and ranging (RADAR), infrared lasers, radiometers, pitot tubes, radiosondes, etc. As used herein, the term "monitor" and variations thereof indicate that sensors of the wind turbine 100 can be configured to provide a direct measurement of one or more parameters being monitored and/or an indirect measurement of such parameter(s). Thus, the sensors 148, 150, 152, 154 can be used to generate signals relating to parameter(s) being monitored, which can then be utilized by the controller 130 to determine an operating condition.

In a model-based control system, one or more models are adapted to represent a motor/engine being controlled (e.g., a wind turbine, etc.). An adaptation of the model(s) allows the control system to make more informed and/or optimal decisions about how to adapt to and/or reconfigure the control when turbine operation is moved away from nominal conditions. An adaptive model-based control system can detect deterioration, faults, failures, and/or damage, and then take such information and incorporate it into the models, optimizations, objective functions, constraints, and/or parameters in the control system, such as in real time. This information allows the control system to take optimized or improved action given current turbine conditions. Since these control systems can be updated and adapted in real time, they allow for a variety of deteriorations, falls, failures, and/or damages to be accommodated, rather than degenerations, faults, failures, and/or damages that have a priori solutions already programmed into the model(s) in the control system.

Many model-based control systems are created by designing a model of each component and/or system that is to be controlled. For example, there may be a model of each engine component and system: turbine, combustor, etc. Each model includes features and/or dynamic characteristics about the component and/or system behavior over time (e.g., speed acceleration, torque, etc.). From the model(s), the system may control, estimate, correct, and/or identify output data based on the modeled information. Model-based diagnostics provide accurate turbine condition information relying on models and sensed parameters.

Rotor induction refers to an effect of the wind turbine on air flow due to the operation of the turbine blades (e.g., a distortion in the wind field). Air flow close to the turbine blades is different from air flow further away from the turbine. Models can be constructed to illustrate wind flow with and without the wind turbine, and induction is the difference between the models. However, such a difference is hard to accurately obtain. Certain examples compute the difference based on turbine location and/or operation, effect(s) average, specific component analysis, time snapshot, and/or effect(s) over time, etc.

Rotor Induction Representation Examples

Induced inflow effects can be defined as perturbations exerted by wind turbine lift and drag forces to the flow upstream of the turbine rotor. Assuming an initial free wind vector field $V_{free}(x,y,z,t)$ in a given spatial domain and time interval (e.g., a wind field without obstruction), induced inflow effects can be represented as a vector field $V_{induced}(x,y,z,t)$ by comparing the free wind field to a wind field that would have resulted in the presence of an operating wind turbine $V_{operating}(x,y,z,t)$. The induced inflow effects can be formally written as $V_{induced}=V_{free}-V_{operating}$, for example.

In certain examples, this subtraction can be achieved using numerical simulation, in which free wind flow can be measured, stored, and simulated with or without one or several wind turbines. Induction effects can decay upstream of the turbine (e.g., at more than two rotor diameters upstream), and a magnitude of induction effect in the rotor plane can be up to 30% of the free-stream longitudinal wind speed, for example.

For engineering modeling purposes, several levels of simplification can be made in order to provide a simplified, yet realistic description. One or more simplification strategies can be applied in successive levels implemented in different orders. Some example simplification strategies are as follows.

For example, modeling can focus on the induced wind field in the wind turbine rotor plane $V_{induced}(0,y,z,t)$. Focusing on the induced field in the wind turbine rotor plane can be sufficient to determine an aerodynamic state of the turbine rotor.

Alternatively or in addition, the rotor plane induced wind field can be expressed in cylindrical coordinates, in which y and z are replaced by r (radial coordinate) and φ (azimuthal coordinate) as $V_{induced}(r,\varphi,t)$.

Alternatively or in addition, azimuthal variation can be averaged to express a rotor plane induced wind field that depends on radius only as $V_{induced}(r,t)$. In this model, effects of individual blade and eventual shear effects are averaged.

Alternatively or in addition, axial and tangential components $V^n_{ind}(r,t)$ and $V^t_{ind}(r,t)$ can be analyzed, while neglecting the radial component of the wind field.

Alternatively or in addition, quasi-steady induced wind field estimates $V^n_{ind,qs}(r,t)$ and $V^t_{ind,qs}(r,t)$ can be determined. These estimates assume, for each time step to, that the free air flow has infinitely been set such that $V_{free}(x,y,z,t)=V_{free}(x,y,z,t_0)$ for all t.

Alternatively or in addition, an average of induced flow over the radius r, which can be expressed as $V^n_{ind,qs}(t)$ and $V^t_{ind,qs}(t)$, can be evaluated. The average can be weighted by a given shape factor, for example.

Alternatively or in addition, a low-pass filtered and/or time averaged induced wind field can be obtained over a given period of time and/or for given wind turbine operating conditions. The filtered and/or time averaged induced wind field can be expressed as $\overline{V^n_{ind}}$ and $\overline{V^n_{ind}}$.

Alternatively or in addition, an evolution of low-pass filtered and/or time averaged induced wind field can be processed as a function of spatial distance to the wind turbine $V^t_{ind,qs}(r,z)$.

For the above example simplification strategies, induction factors can be built by normalizing induced flow fields with respect to one or more wind speeds of reference.

Example Induction Effects for Remote Sensor Wind Field Estimation

Thus, induction effects are important for remote sensor wind field estimation close to the blade/rotor of the wind turbine (e.g., wind turbine 100). Inputs provided by remote sensing and wind estimation can be used to calculate and correct for such induction effects. Inputs include a projection of wind onto a remote sensing geometry, a time of flight, a convection of distant wind to the rotor plane, and/or a reconstruction of wind speed, direction and shear, for example.

Remote sensors such as LIDAR, RADAR, and/or SODAR utilize reflected properties of laser, radio and sound waves onto the atmosphere's particles to determine components or projection of a wind field on one or several measurement locations located remotely from a sensor. The laser, radio, and/or sound waves can be collimated to define discrete beams that form a measurement volume. A number and location of the measurement volume(s) and/or a sampling rate of measurement depends on a type of sensor used, for example.

For instance, a pulsed Doppler Lidar sensor can be mounted onto the nacelle 122 of a wind turbine 100. The example pulsed Doppler Lidar sensor with five beams can measure a plurality of ranges (e.g., 10 different ranges, resulting in 50 measurement points across the 5 beams, etc.).

Due to the nature of the remote sensing measurement process, measurements may suffer from limitations when compared to a reference sensor such as a three-dimensional (3D) sonic anemometer (which needs to be co-located with the location of the measurements, unlike a remote sensor). For example, the remote LIDAR sensor may be able to measure only specific components of the wind field (e.g., collinear or orthogonal to a beam, etc.). The remote sensor may measure over a volume compared to a point (e.g., a Lidar measurement volume can be a cylinder of 5 cm radius and 30 m length, etc.). The remote sensor may measure with an integration time (e.g., 0.25 s, etc.). The remote sensor may measure one or several locations at a time during a scanning pattern (e.g., a one second scanning pattern, etc.).

Certain examples provide a wind model and propagation model. For example, wind estimation for a wind turbine involves determining wind metrics representative of the wind field approaching the wind turbine 100 with a given preview time. Wind metrics can include rotor averaged wind speed, vertical and/or horizontal wind direction, vertical and/or horizontal shear, etc. In certain examples, wind estimation involves (a) a parametric wind model that represents quantities to be estimated and (b) a parametric propagation model that represents space/time propagation of a wind variation. An example wind propagation model can assume that wind patterns are travelling unchanged at a given wind speed (e.g., referred to as Taylor hypothesis). This hypothesis allows the example wind propagation model to use measurement from different distances upstream of the turbine with a time delay which accounts for their propagation. The hypothesis also allows the example wind propagation model to use measurement from one or several distances upstream of the turbine to predict the evolution of a wind metric as a function of time, assuming one time correspond to the wind metric observed and impacting by the turbine rotor.

While Taylor's hypothesis can be useful, the hypothesis is not strictly valid. For example, measuring wind too far upstream (e.g., more than 1 km) will not be a good prediction for the wind that will affect the turbine since the time the wind takes to travel is too long. The long travel time introduces a large chance that the wind pattern changes due to turbulence evolution over the distance. Change in wind pattern can be accounted for as long as the remote sensing is applied at well-suited ranges in front of the rotor, given specific scales of turbulence which are to be predicted. For example, to predict turbulent scales of 100 m, which would have a 10 s life span, one would seek a measurement approximately 100 m upstream of the wind turbine.

Determining a convection velocity of turbulence that is assumed to be constant or "frozen" can be important. In some examples, however, a mean flow wind speed can be a good approximation for the convection velocity.

In certain examples, mean and dynamic induction models can be generated. A mean induction model can be used to estimate LIDAR wind speed, for example. The mean induction model can be used to correct LIDAR measurement for mean slow-down of wind velocity as it approaches the turbine (e.g., can be part of the wind model), for example. The mean induction model can be used to eventually correct the propagation speed for slow-down as the wind approaches the turbine, for example.

Figure 3A:
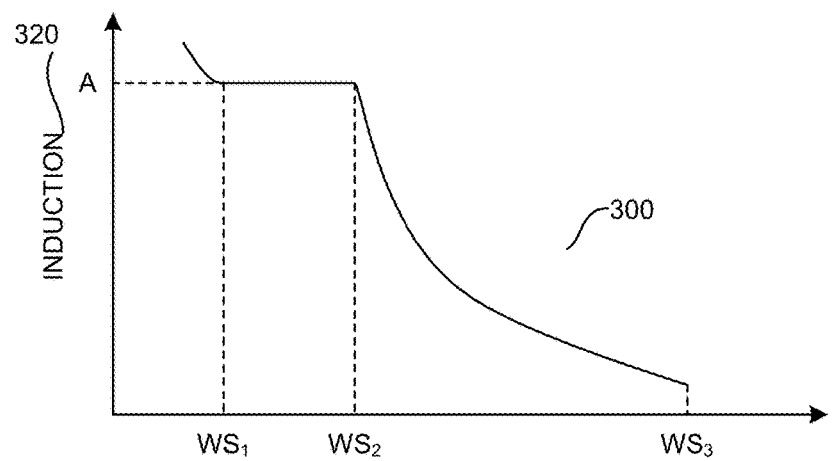
FIGS. 3A-3B illustrate example graphs showing correlations between wind speed and induction and between distance to turbine and wind speed.
Figure 3B:
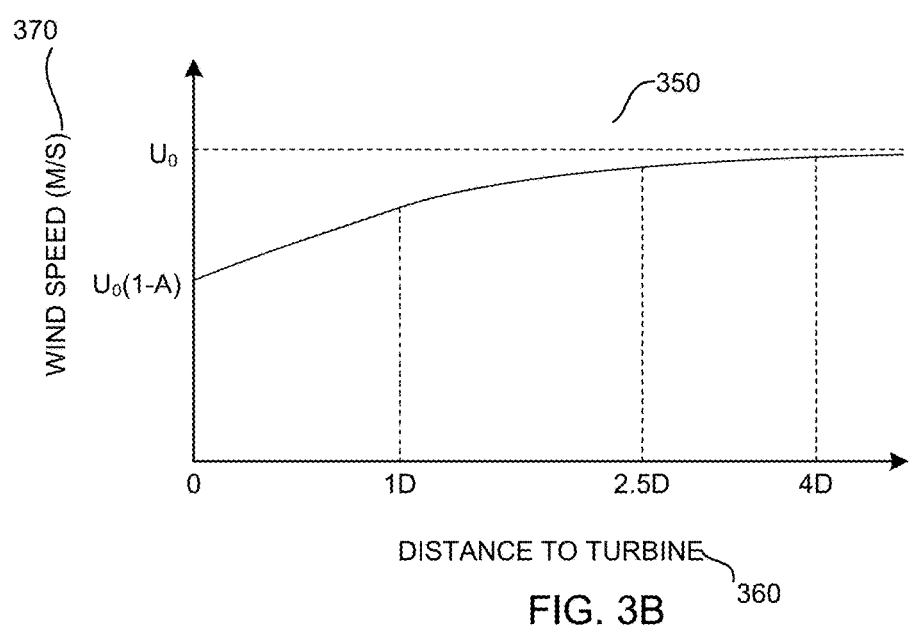

FIGS. 3A-3B illustrate example graphs showing correlations between wind speed and induction (FIG. 3A) and between distance to turbine and wind speed (FIG. 3B). As shown in the example graph 300 of FIG. 3A, as wind speed 310 increases, an induction effect 320 from the turbine 100 decreases. For example, the induction A remains relatively constant at $WS_1$ and $WS_2$ but decreases exponentially at $WS_3$. In an example (such as the graph 300 of FIG. 3A), a value for an induction constant plateau is ⅓.

As shown in the example graph 350 of FIG. 3B, as distance to turbine 360 increases, wind speed 370 also increases. For example, wind speed 370 gradually increases from $U_0(1-A)$ to $U_0$ as the distance to turbine 360 increases from 0 to one distance interval corresponding to rotor diameter (1D) to 2D and 4D.

Figure 4B:
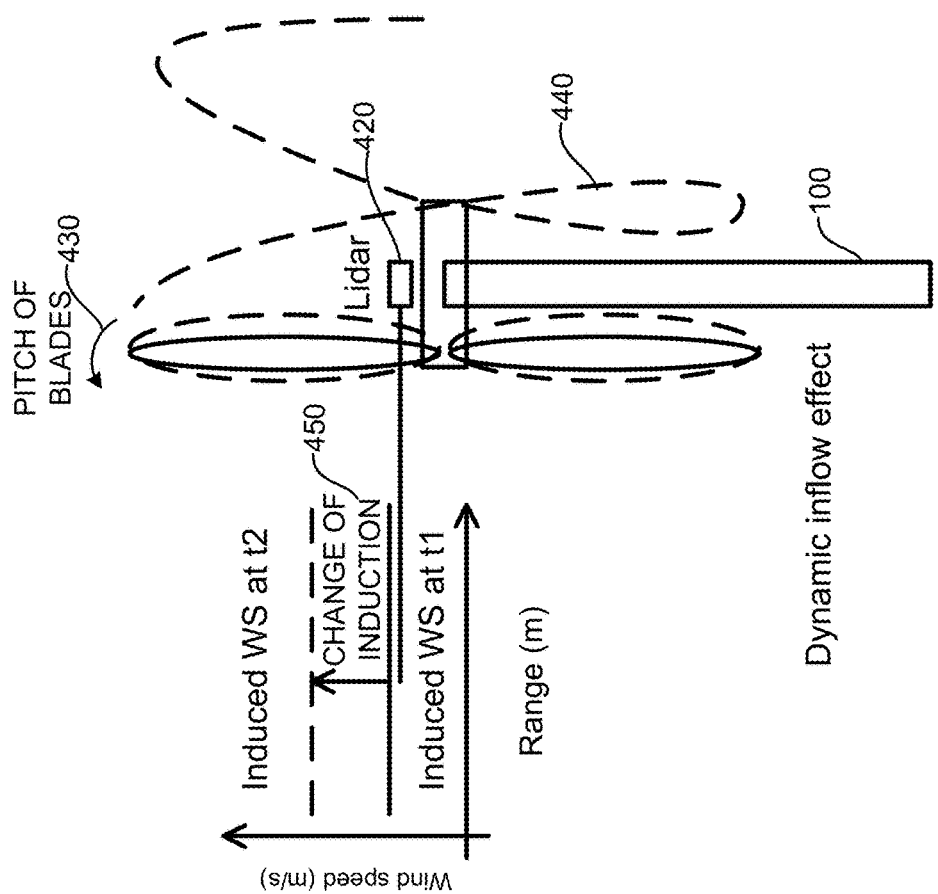
FIGS. 4A-4B illustrates an example propagation of wind disturbance and dynamic inflow effect.
Figure 4A:
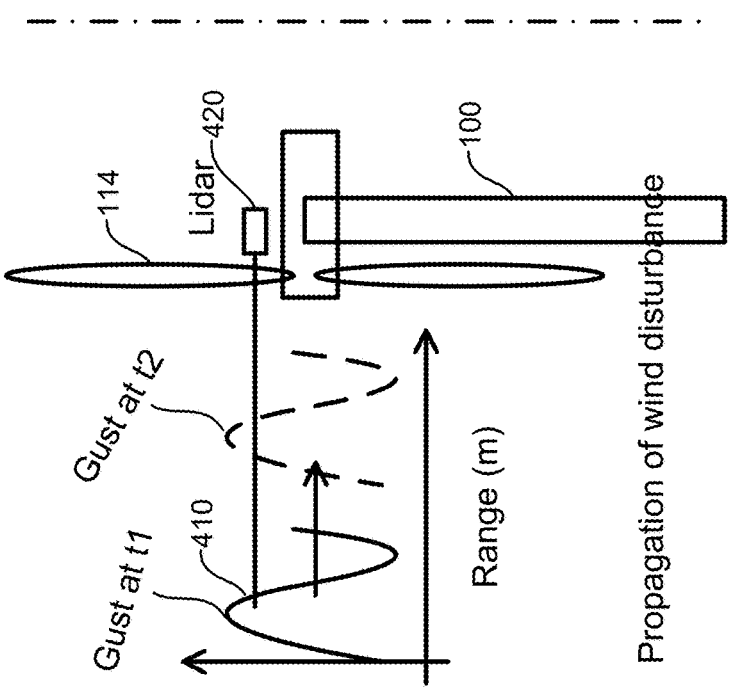

A dynamic induction model can also be used to estimate LIDAR wind speed differently from the mean induction model. FIGS. 4A-4B illustrate example propagation of wind disturbance and dynamic inflow effect. As shown in the example of FIG. 4A, propagation of a gust of wind 410 at a predicted wind speed can be measured by a Lidar sensor 420. FIG. 4B shows how the Lidar 420 perceives a change of induction (e.g., due to a pitch action on one or several blades, etc.). If induction changes, all ranges are affected substantially at once, resulting in a lack of propagation that is to be corrected.

In the example of FIG. 4A, propagation of the wind gust 410 is dictated by the Taylor hypothesis convection speed. The Taylor hypothesis means that the wind gust 410 is measured first by the farthest ranges (e.g., at time t1) and a few second later by the closest ranges (e.g., at time t2), which can be modelled by the above-described propagation model.

In the example of FIG. 4B, a change of pitch 430 causes a discontinuity in the wake 440 of the wind turbine 100, which will be progressively convected downstream of the wind turbine 100. During this time, the induction gradually changes 450 (e.g., from t1 to t2) with a delay corresponding to the wake propagation. Due to the nature of induction upstream propagation as an induced pressure differential due to downstream wake; the Lidar 420 measures these induced changes in wind speed at all ranges at the same time (e.g., induction effects propagate upstream at the speed of sound (e.g., 340 m/s), which can be considered very fast compared to convection speed (e.g., 10 m/s)). If the induction effect is not accounted for during estimation of Lidar wind, wind variation due to dynamic inflow effect will instead be improperly convected as a wind gust, leading to significant errors in turbine control. Due to the nature of the induction dependency to wind speed, these errors are likely to be important for wind speed where induction is high, and regions where induction varies as a function of wind speed. In an example, it was observed that regions of wind speed from 3 m/s up to 15 m/s were significantly affected.

For example, the Lidar sensor 420 can be mounted on the nacelle 122 of the wind turbine 100 and/or near the wind turbine in a wind farm, for example. The Lidar 420 can be measuring wind speed data from 10 m up to 200 m in front of the wind turbine rotor, for example.

As discussed above, the wind turbine 100 causes a distortion of the wind field measured by the Lidar 420 through induction. Induction (also referred to as induced flow) refers to wind field disturbances that propagate quasi-instantaneously upstream and downstream of the air flow as a consequence of the vortical nature of lift forces exerted on the turbine blades.

In a wind farm, for example, the turbine 100 can be facing various directions, depending upon wind direction, and can face another turbine. Thus, wind generated by the other turbine can account for induction/distortion affect (e.g., wind turbine yaw position) as well.

Induction effects can be decomposed into two components: a static component and a dynamic component. The static or mean component refers to average wind slow down as air flow approaches the turbine 100, for example, considering all rotor positions and various turbine dynamics. Static or mean induction causes a decrease in an average magnitude of the upstream wind. Dynamic induction is related to instantaneous turbine and wake dynamics, which tend to exert a delayed induction feedback on the air flow. Dynamic induction can disrupt a preview time for a wind disturbance using a non-corrected convection algorithm.

Figure 5:
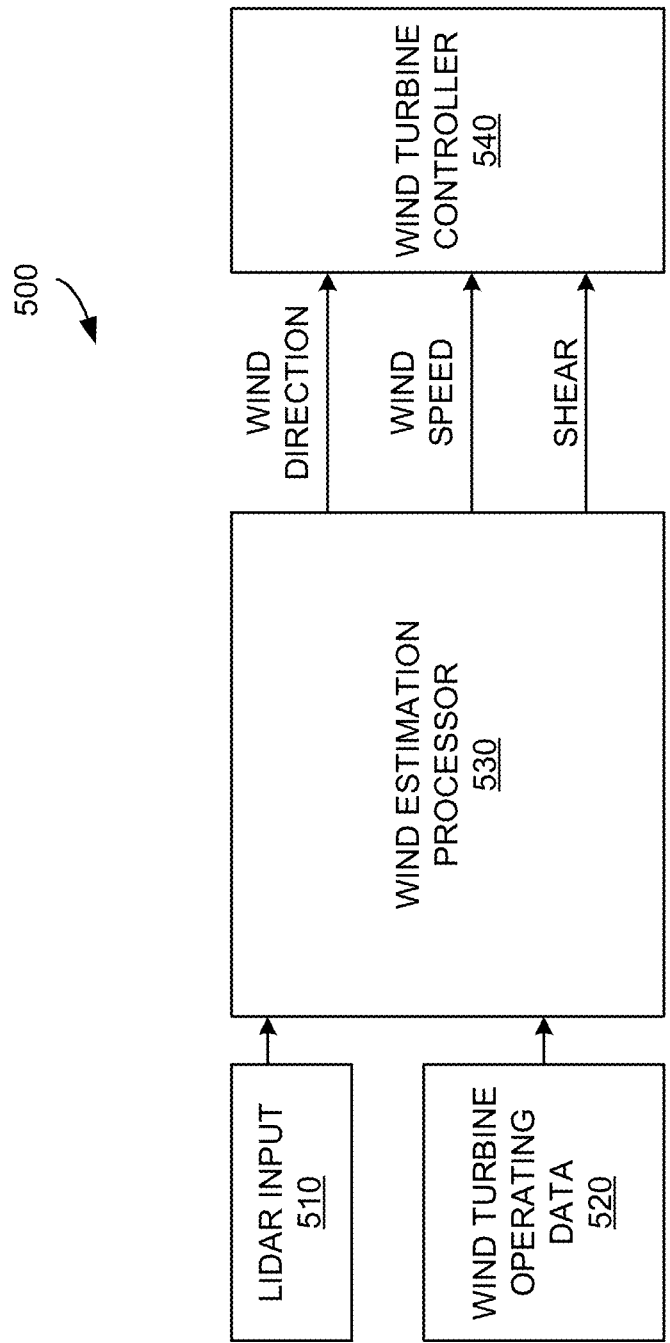
FIG. 5 illustrates an example wind processing system to control the wind turbine.

FIG. 5 illustrates an example wind processing system 500 to control the wind turbine 100. In certain examples, the wind processing system 500 forms all or part of the controller 130 described above with respect to FIG. 2. The example wind processing system 500 includes a LIDAR input 510 and wind turbine operating data 520 input to a wind estimation processor 530 to generate output, such as wind direction, wind speed, and/or wind shear, to drive a wind turbine controller 540. The wind estimation processor 530 generates a wind propagation model based on the LIDAR input 510 and/or turbine operating data 520. The wind propagation model can include an extended Kalman filter (EKF) to determine a wind profile, induction flow, estimator uncertainty, etc.

To use Lidar measurements 510 for wind turbine control 530, an accurate feed-forward wind estimate of the rotor average wind speed, wind direction, and shear components are derived by the wind estimation processor 530. In certain examples, accuracy is defined as a forecast accuracy with a fixed desired signal preview time (e.g., 2 s) and attained with +/−0.5 s accuracy, and the desired Lidar signal to turbine response correlation is above a threshold (e.g., above 0.7), before performance starts to degrade.

As discussed, wind turbine 100 influences the wind through induction, both in a static and dynamic manner. The static component relates to a slowdown in wind as the wind approaches the turbine 100. Close LIDAR measurements can be rescaled to account for static induction. The dynamic component relates to a delayed induction feedback exerted by turbine and wake dynamics on air flow, which tends to disrupt the preview time for a simple convection algorithm.

Static and dynamic induction effects impact wind estimation accuracy, especially for lower wind speed and/or for high induction designs. Without induction corrections, these effects can alter preview time by several seconds (e.g., up to 15 s), and decrease correlation of estimated wind to turbine response, thus significantly lowering the value of Lidar estimated wind. Certain examples disclosed and described herein derive higher accuracy wind estimates that do not suffer from these limitations. Certain examples provide improved feed-forward LIDAR controls based on the improved accuracy in wind estimates accounting for static (e.g., mean) and dynamic induction effects.

Examples Estimating Mean and Dynamic Induction Models for LIDAR Wind Field Estimation In certain examples, a turbine parameter such as rotor aerodynamic thrust can be estimated from turbine operating data. For example, at a given time, a value of aerodynamic thrust, T, can be derived from strain gauge measurements located in the tower 116 and/or blades 114 of the example turbine 100. However, a model based estimator can also be used to determine thrust and/or other parameter values. For example, a rotor estimated wind observer, $V_{est}$, uses rotor speed, $\Omega$, generator torque, Q, and collective blade pitch angle, $\theta$, as inputs to estimate thrust. As example, with such a model, thrust can be estimated as:

$$T = \tfrac{1}{2}\rho\pi R^2 V_{est}^2 C_T(\lambda,\theta) \tag{Eq. 1}$$

In the example of Equation 1, $\rho$ is a measured or estimated air density; R is a wind turbine rotor radius; and $C_T$ is a thrust coefficient look-up table specific for the wind turbine, which depends on blade pitch angle θ and tip speed ratio $$\lambda = \frac{\Omega R}{V_{est}}.$$

In certain examples a rotor estimated wind observer $V_{est}$ allows equivalent use of thrust T or thrust coefficient $C_T$.

Mean Induction

In certain examples, an induction factor can be estimated from turbine operating data. For example, turbine operating data, such as rotor aerodynamic thrust coefficient, $C_T$, can be used to form an aerodynamic model, such as an actuator disk model, to estimate, at a given time, induction under quasi-steady flow assumption. In the following, for purposes of example illustration, the focus is on estimation of mean axial induction averaged over the entire rotor. A more sophisticated approach can include a radius dependent estimation, estimation of tangential induction (and all types of induced field described above), etc.

Average (e.g., low pass filtered) estimates can be determined for the thrust coefficient $C_T$. The averaging time can range from 20 s to several minutes, which dictates a type parameters used for filtering. In the following, a low pass filtered variable, X, is denoted as $\tilde{X}$ (e.g., $C_T$ filtered is denoted as $\tilde{C_T}$). As detailed above, the variable can be obtained from a low pass filtering of the rotor estimated wind observer, $V_{est}$, referred to as $\tilde{V_{est}}$.

If a thrust observer T is available, a low pass filtered version of thrust, denoted $\tilde{T}$, allows an estimate $$\tilde{C_T} = \frac{\tilde{T}}{1/2 \rho \pi R^2 \tilde{V_{est}}^2}.$$

If no thrust observer T is available, a look up table for $C_T(\lambda, \theta)$ allows estimation of $\tilde{C_T}(\tilde{\lambda}, \tilde{\theta})$, where $$\tilde{\lambda} = \frac{\tilde{\Omega} R}{\tilde{V_{est}}},$$

and $\tilde{\theta}$ is the filtered version of θ, the blade pitch angle.

A mean induction, $\tilde{a}$, can be estimated from $\tilde{C_T}$. One implementation uses the actuator disk model, which relates rotor average induction factor to $C_T$:

$$\tilde{C_T}(\tilde{\lambda},\tilde{\theta}) = 4\tilde{a}(1-\tilde{a}) \quad \text{(Eq. 2)}.$$

Inverting this equation allows $\tilde{a}$ to be computed as:

$$\tilde{a} = \begin{cases} 1/2\left(1 - \sqrt{1 - \tilde{C_T}}\right) & \text{if } Ct < 0.9 \\ \frac{(4 + Ct_0 - 4\sqrt{Ct_0} - \tilde{C_T})}{4(1 - \sqrt{Ct_0})} & \text{if } Ct \geq 0.9 \end{cases}, \quad \text{(Eq. 3)}$$

wherein $Ct_0 = 1.6$ is a thrust Coefficient constant.

In another example, a second look-up table can be derived for $\tilde{a}(\tilde{\lambda}, \tilde{\theta})$, and more sophisticated modeling making use of blade element theory to estimate a as a function of a radius of interest. Another approach is to derive a second look-up table for $a(\lambda,\theta)$. Blade element theory can be used to model and estimate a as a function of a radius of interest.

In certain examples, a flow model for mean axial induction is determined. For example, once a mean axial induction factor is known, a flow model that includes mean axial induction can be used. As an example, such a model can be derived by a vortex line representation of the rotor interaction with the air flow. Integration of the mean induced flow on a center line upstream of the turbine 100 leads to an expression for induced flow $$\widetilde{V^n_{ind}}(z,t) = \tilde{V}_0(t)\left[1 - \widetilde{a(t)}\left(1 + \frac{z/R}{\sqrt{1 + (z/R)^2}}\right)\right]. \quad \text{(Eq. 4)}$$

In the example of Equation 4, $\tilde{V}_0$ is filtered upstream wind speed, R is rotor radius, and z is an axial coordinate. A simplifying assumption can be to assume the expression of Equation 4 holds outside of the centerline axis (when r≠0). Such a model can be extended to include a vertical and horizontal wind shear which results in a vertical and lateral dependency, and vertical and horizontal wind directions which results in other components besides the longitudinal one.

Other approaches include computing and storing a database of mean induced flow field outside of the centerline and for a large number of operating conditions using numerical simulation and/or detailed measurements, as a function of turbine operating conditions.

Finally, the flow model for mean axial induction can be used to directly correct for Lidar measurements. This correction can be done by rescaling the lidar measured wind speed by a range dependent ratio:

$$\left[1 - \widetilde{a(t)}\left(1 + \frac{z/R}{\sqrt{1 + (z/R)^2}}\right)\right]. \quad \text{(Eq. 5)}$$

Alternatively, a flow model for mean axial induction can be used as an input for the fitting process of the parametric wind model which represents the wind speed, direction and shear quantities to be estimated from Lidar data.

Dynamic Induction

In certain examples, dynamic axial induction can also be determined. For example, a quasi-steady axial induction factor can be determined from turbine operating data. Use of turbine operating data, such as rotor aerodynamic thrust coefficient, $C_T$, enables use of aerodynamic models, such as an actuator disk model, to estimate, at a given time, induction under quasi-steady flow assumption. In the following example, an estimation of axial induction is averaged over an entire rotor. A more sophisticated approach includes a radius dependent estimation, estimation of tangential induction (and all types of induced field described above), etc.

In certain examples, a quasi-steady estimate of axial induction, $a_{qs}(t)$, is derived. If a thrust observer, T, is available, the thrust observer allows estimation of $$C_T = \frac{T}{1/2\rho\pi R^2 V_{est}^2}.$$

If no thrust observer, T, is available, a look up table for $C_T(\lambda,\theta)$ can be directly used, where $$\lambda = \frac{\Omega R}{V_{est}},$$

and θ is the blade pitch angle.

Next, a quasi-steady induction, $a_{qs}$, is estimated from $C_T$. One implementation uses the actuator disk model, which relates rotor average induction factor to $C_T$:

$$C_T(\theta, \lambda) = 4 a_{qs}(1 - a_{qs}) \qquad \text{(Eq. 6)}.$$

Inverting this equation allows $a_{qs}$ to be computed as:

$$a_{qs} = \begin{cases} 1/2\left(1 - \sqrt{1-C_T}\right) & \text{if } Ct < 0.9 \\ \dfrac{(4 + Ct_0 - 4\sqrt{Ct_0} - C_T)}{4(1 - \sqrt{Ct_0})} & \text{if } Ct \geq 0.9 \end{cases}, \qquad \text{(Eq. 7)}$$

wherein $Ct_0 = 1.6$ is a thrust coefficient constant.

Another approach can include deriving a second look-up table for $a_{qs}(\lambda, \theta)$, and more sophisticated modeling make use of blade element theory allowing estimation of $a_{qs}(\lambda, \theta, r)$ as function of the radius r of interest.

Certain examples facilitate estimation of a dynamic axial induction factor with delayed induction model. While changes of real induction lead to an instantaneous pressure induced change of upstream flow, knowledge of wind turbine system 100 shows that the induced flow field does not adapt instantaneously to the quasi-steady induction estimate, but rather to a delayed dynamic induction factor. The delay is due at least in part to a physical phenomenon that generates the induced flow (e.g., the wake in air downstream from the rotor), which takes time to adapt as the air flow is convected away from the turbine 100, for example. For example, vertical structures shed from wind turbine blades 114 are responsible for establishing the induced wind field. While the blade 114 structure acts instantaneously or substantially instantaneously on the induced flow field, which involves modeling for a LIDAR measurement model, the induced flow field also evolves according its own dynamics, which convects them further away from the sensor. The dynamic induction effect is to be captured to obtain a realistic representation of induction, which cannot be provided by the quasi-steady estimate.

In certain examples, induced flow is estimated by applying a first order filter to the quasi-steady induction, $a_{qs}$, to account for wake propagation. A dynamic equation can be written as:

$$\sigma_1 \frac{da}{dt} = a_{qs} - a. \qquad \text{(Eq. 8)}$$

The Equation 8 models a dynamic induction effect for a time delay, $\sigma_1$, that elapses before a can attain the quasi-steady value $a_{qs}$. $\sigma_1$ is a measure of time elapsed for the wake to convect downstream and can be written as $$\sigma_1 = \frac{R}{V} f(a),$$

where R is a rotor radius and V represents a mean inflow wind speed, which can be retrieved from a low pass filtered of the rotor estimated wind observer $V_{est}$, referred to as $\widetilde{V_{est}}$. An expression for f(a) can be $$f(a) = \frac{1.1}{2(1 - 1.3a)}.$$

As a numerical example, at 10 m/s, for R=50 m and an induction a=0.3, the value of $\sigma_1$ is 4.5 seconds. The integration of $$\sigma_1 \frac{da}{dt} = a_{qs} - a$$

can be carried out with a first order numerical integration scheme.

In certain examples, other dynamic induction models, including radius dependent induction models, and/or data driven models which predict dynamic induction from turbine operating data can be considered.

Once a dynamic axial induction factor is known, a flow model that includes dynamic axial induction can be used. As an example, such a flow model can be derived by a vortex line representation of the rotor interaction with the wind flow. Integration of the mean induced flow on a center line upstream of the turbine leads to an expression for induced flow as follows:

$$V_{ind}^n(z, t) = V_0(t)\left[1 - a(t)\left(1 + \frac{z/R}{\sqrt{1 + (z/R)^2}}\right)\right]. \qquad \text{(Eq. 9)}$$

In the example of Equation 9, $V_0$ is an estimated upstream wind speed, R is a rotor radius, and z is an axial coordinate. A simplifying assumption can be to assume this expression holds outside of the centerline axis (e.g., when r≠0). Such a model can be extended to include a vertical and horizontal wind shear which results in a vertical and lateral dependency, and vertical and horizontal wind directions which results in other components besides a longitudinal component.

Other approaches can include computing and storing a database of dynamically induced flow fields shapes outside of the centerline, and for a large number of operating conditions using numerical simulation and/or detailed measurements, as a function of turbine operating conditions.

In certain examples, a flow model for mean axial induction can be used to directly correct for LIDAR measurements. Correction can be done by rescaling the LIDAR measured wind speed by a range dependent ratio:

$$\left[1 - a(t)\left(1 + \frac{z/R}{\sqrt{1 + (z/R)^2}}\right)\right]. \qquad \text{(Eq. 10)}$$

Alternatively, the flow model for dynamic axial induction can be used as an input for a fitting process of the parametric wind model which represents the wind speed, direction and shear quantities to be estimated from Lidar data.

Figure 6A:
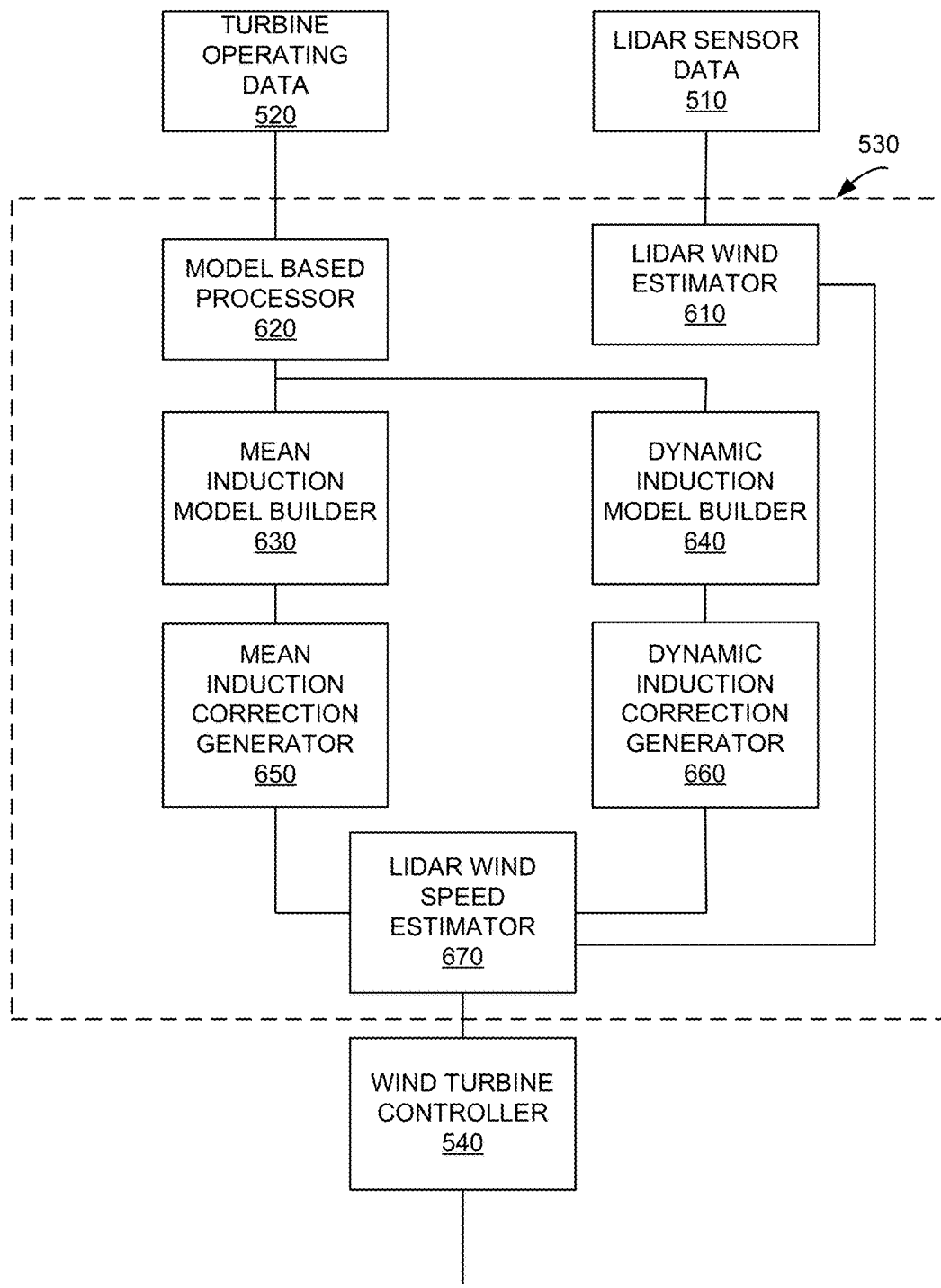
FIGS. 6A-6C illustrate some example implementations of the wind estimation processor of the example wind processing system of FIG. 5.
Figure 6B:
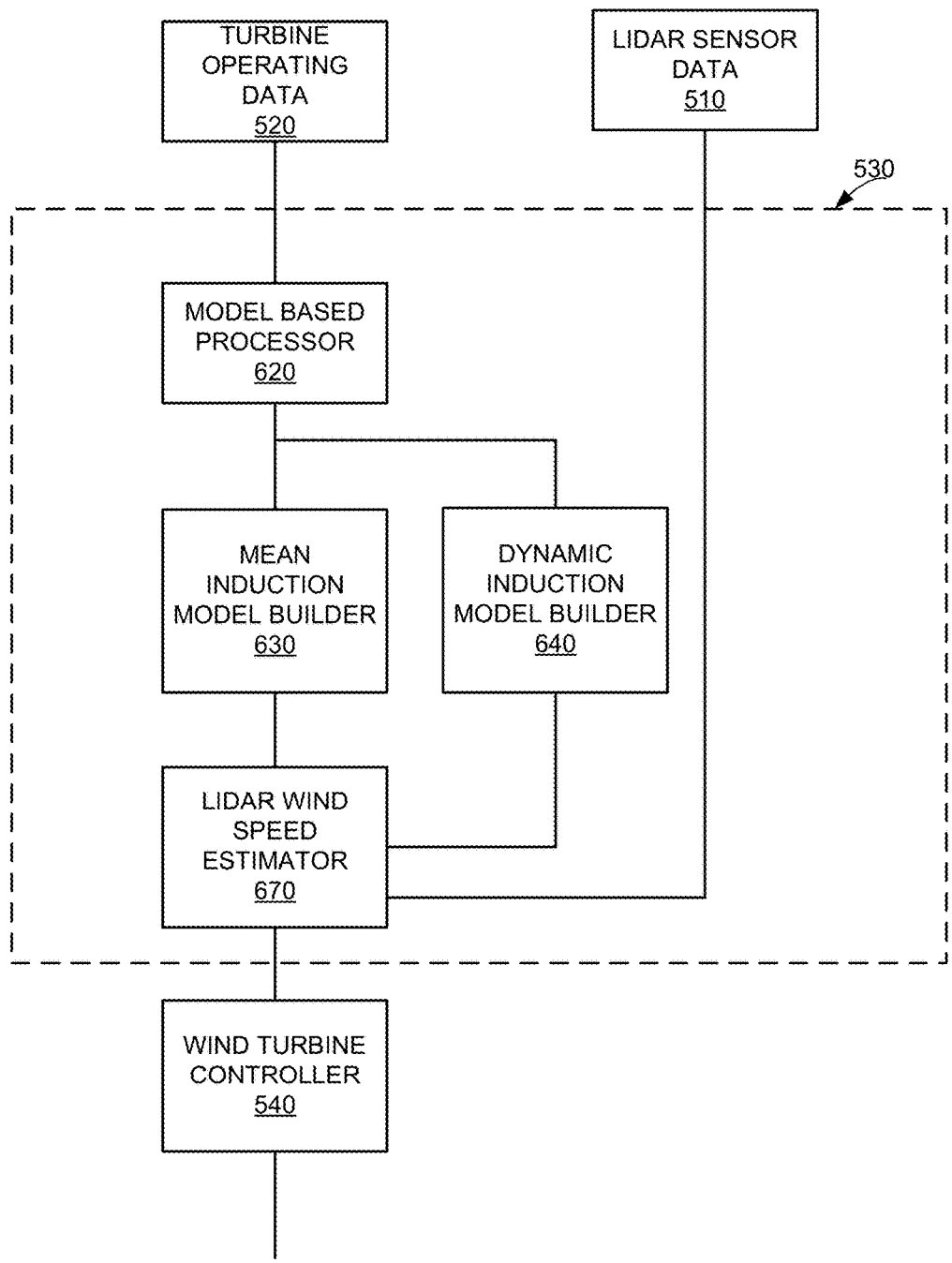
Figure 6C:
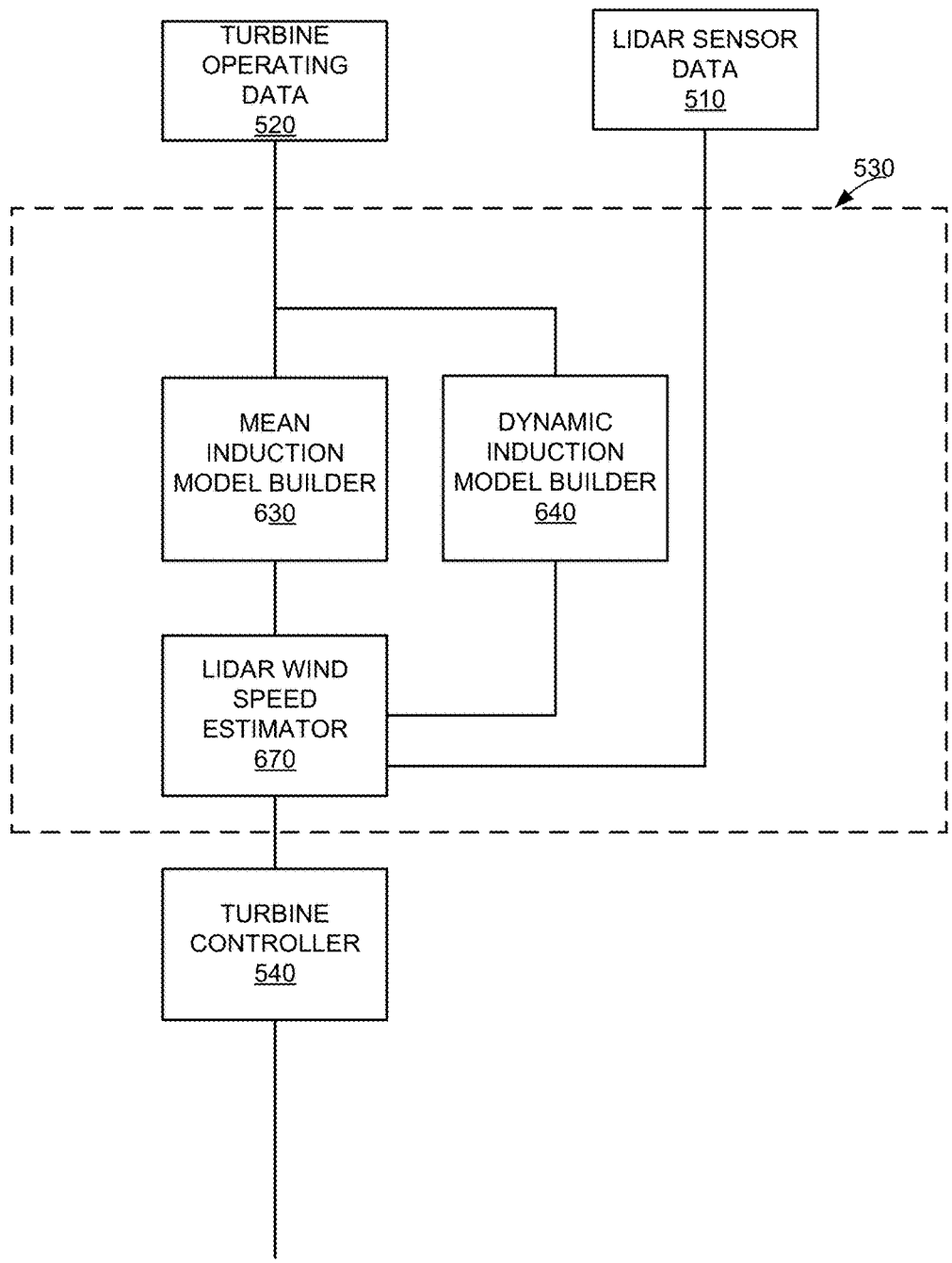

FIGS. 6A-6C illustrate some example implementations of the wind estimation processor 530. The example wind estimation processor 530 receives the LIDAR sensor data 510 and turbine operating data 520 as inputs and processes one or both inputs 510, 520 to generate one or more outputs, such as wind speed, wind direction, wind shear, etc., for the wind turbine controller 540, for example. While FIGS. 6A-6C each illustrate an example implementation of the processor 530, other configurations can be implemented to process the data 510, 520 to generate output parameters, instructions, etc., for the turbine controller 540.

In the example of FIG. 6A, the wind estimation processor 530 includes a LIDAR wind estimator 610, a model-based processor 620, a mean induction model builder 630, a dynamic induction model builder 640, a mean induction correction generator 650, a dynamic induction correction generator 660, and a LIDAR wind speed estimator 670. As shown in the example of FIG. 6A, the LIDAR wind estimator 610 receives the input LIDAR sensor data 510 and estimates properties of the wind based on measurements obtained by the LIDAR sensor laser, etc. As shown in the example of FIGS. 4A-4B, the LIDAR sensor 420 estimates properties of the wind 410 as it travels over time in front of the sensor 420. The LIDAR wind estimator 610 evaluates speed, direction, shear, etc., based on measurements from the sensor 420. In certain examples, the LIDAR sensor 420 can be mounted on the turbine 100 and/or elsewhere in a wind farm including one or more turbines.

In certain examples, the model-based processor 620 processes turbine operating data 520 to estimate turbine output parameters such as generator speed, power, rotor thrust, torque, blade pitch, etc. The model-based processor 620 provides accurate turbine condition information relying on models and/or sensed (e.g., measured) parameters.

For example, rotor aerodynamic thrust can be estimated from turbine operating data. For example, at a given time, a value of aerodynamic thrust, T, can be derived from strain gauge measurements located in the tower 116 and/or blades 114 of the example turbine 100. However, a model based estimator can also be used to determine thrust and/or other parameter values. For example, Equation 1, described above, can be used to estimate thrust based on measured and/or modeled rotor speed, generator torque, blade pitch angle, etc. A model of the turbine 100 formed from the input information 520 and/or other information regarding turbine 100 components, operation, operating conditions, etc., is used by the model-based processor 620 to estimate/model turbine output parameter(s), for example.

The mean induction model builder 630 uses the wind turbine output parameter(s) estimated by the model-based processor 620 to build a model of mean induction effects for the wind turbine 100. The mean induction model can be an aerodynamic model (e.g., an actuator disk model, etc.), for example, to model mean induction at a given time under a quasi-steady air flow assumption. The generated model can be used to measure mean induction averaged over the entire rotor, for example. The mean induction model can be based on Equations 2 and/or 3 described above.

The dynamic induction model builder 640 uses the wind turbine output parameter(s) estimated by the model-based processor 620 to build a model of dynamic induction effects for the wind turbine 100. The dynamic induction model can be reflected in Equations 6, 7, and/or 8 described above.

The mean induction correction generator 650 uses the mean induction model to generate a mean induction corrector factor to be applied to a LIDAR wind speed estimate. For example, Equations 4 and/or 5, described above, illustrate how the mean induction model can be used to formulate a correction factor for mean induction with respect to a LIDAR estimate of wind speed (e.g., as part of a flow model). Thus, sensor information (e.g., blade pitch angle, rotor speed, power output, torque, etc.) and/or model information can be used with a low-pass filter, estimated wind speed, rotor radius, air density, thrust coefficient, and/or estimated mean thrust, etc., to compute a mean induction correction factor based on Equations 2 and 3 to be applied per Equations 4 and 5. Mean induction can be deduced from thrust and/or other turbine parameter as a function of wind speed, for example.

The dynamic induction correction generator 660 uses the dynamic induction model to generate a dynamic induction corrector factor to be applied to the LIDAR wind speed estimate. For example, Equations 9 and/or 10, described above, illustrate how the dynamic induction model can be used to formulate a correction factor for dynamic induction with respect to the LIDAR estimate of wind speed (e.g., as part of a flow model). Thus, sensor information (e.g., blade pitch angle, rotor speed, power output, torque, etc.) and/or model information can be used with a low-pass filter (e.g., to remove noise), thrust coefficient (e.g., computed from model-based thrust, etc.), rotor scaling constant, and/or wind speed scaling constant, etc., to compute a dynamic induction correction factor based on Equations 6-8 to be applied per Equations 9 and 10. Dynamic induction can be deduced from thrust and/or other turbine parameter as a function of wind speed, for example. The dynamic induction model can be integrated by the dynamic induction correction generator 640 to compute the delayed or dynamic induction correction factor.

Thus, the mean and dynamic induction correction factors can be generated based on one or more simplifications of wind field behavior/characteristic. For example, an average induced flow over a radius r (e.g., taken alone and/or weighted according to a shape factor, etc.) and a low-pass filtered and/or time-averaged induced wind field (e.g., over a given period of time and/or for given wind turbine operating conditions, etc.) can be determined and used to affect a LIDAR estimate of wind speed with respect to the turbine 100.

The LIDAR wind speed estimator 670 estimates wind speed based on an output from the LIDAR wind estimator 610 adjusted by the mean induction correction factor and the dynamic induction correction factor. For example, Equations 5 and 10 can be applied to adjust the LIDAR estimate according to the mean and dynamic induction factors. The LIDAR wind speed estimate can be based on an initial wind parameter estimate (e.g., from the LIDAR wind estimator 610) adjusted by calculated mean wind speed variation. The LIDAR wind speed estimator 670 outputs a wind speed for use by the wind turbine controller 540 to control operation of the wind turbine 100. In certain examples, the wind speed estimator 670 can also output one or more other wind turbine control parameters including wind direction, wind shear, etc., to be provided to the wind turbine controller 540.

The example of FIG. 6B operates similarly to the example configuration of FIG. 6A to generate output to adjust operation of the wind turbine controller 540. However, in the example of FIG. 6B, no initial LIDAR estimator 610 is employed to process the LIDAR sensor data 510. Additionally, no mean or dynamic induction correction factors are generated by respective generators 650, 660. Instead, the model-based processor 620 processes turbine operating data 520 and provides input to the mean induction model builder 630 and the dynamic induction model builder 640. The LIDAR wind speed estimator 670 uses the mean induction model and the dynamic induction model in conjunction with the LIDAR sensor data 510 to determine and correct an estimate of wind speed, etc., to be provided to the wind turbine controller 540.

The example of FIG. 6C operates similarly to the example configurations of FIGS. 6A and 6B to generate output to adjust operation of the wind turbine controller 540. However, in the example of FIG. 6C, no initial LIDAR estimator 610 or model-based processor 620 is employed. Instead, the turbine operating data 520 is used directly (e.g., measured) to form models via the mean induction model builder 630 and the dynamic induction model builder 640. The LIDAR wind speed estimator 670 uses the mean induction model and the dynamic induction model in conjunction with the LIDAR sensor data 510 to determine and correct an estimate of wind speed, etc., to be provided to the wind turbine controller 540.

Figure 7:
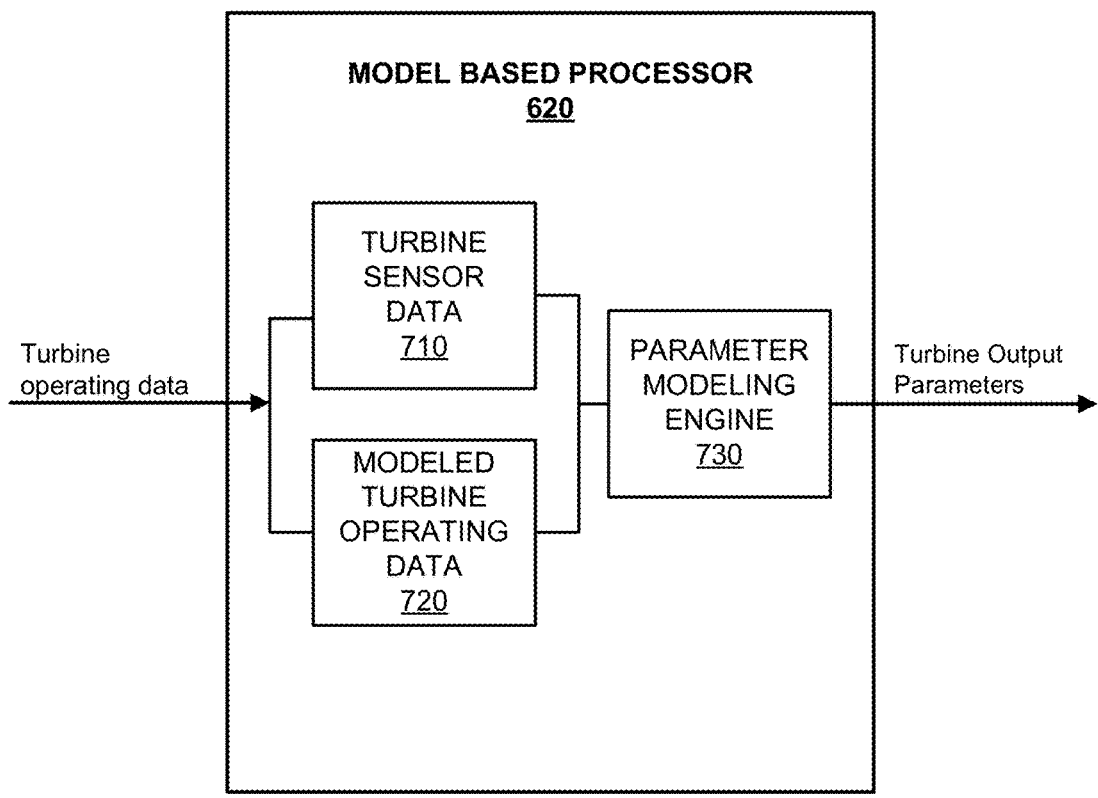
FIG. 7 illustrates an example implementation of the model based processor of the example of FIGS. 6A-6B.

FIG. 7 illustrates an example implementation of the model based processor 620. As shown in the example of FIG. 7, the model based processor 620 receives turbine operating data 520 and processes the data to generate one or more turbine output parameters used by the model builders 630, 640 to generate mean and dynamic induction flow models with respect to the turbine 100. The example model based processor 620 of FIG. 7 utilizes turbine sensor data 710 and/or modeled turbine operating data 720 as input to a parameter modeling engine 730 to generate one or more turbine output parameters for the mode builders 630 and/or 640.

For example, the turbine sensor data 710 includes values measured from one or more sensors (e.g., strain gauge, rotor speed sensor, yaw angle sensor, blade pitch angle sensor, etc.) located in and/or on the turbine 100, such as generator speed, power, rotor thrust, torque, blade pitch, etc. The modeled turbine operating data 720 utilizes previously predicted and/or measured values to estimate current turbine operating parameters/conditions.

In the example of FIG. 7, the parameter modeling engine 730 processes the turbine sensor data 710 and/or the modeled turbine operating data to generate the output. For example, information such as load torque, previously predicted wind speed, previously predicted rotor speed, measured rotor speed, measured blade pitch angle, measured yaw error angle, desired rotor speed, desired load torque, desired pitch angle, etc., can be used by the parameter modeling engine 730 to generate thrust, wind speed, rotor, etc., information for the model builders 630, 640.

Figure 8:
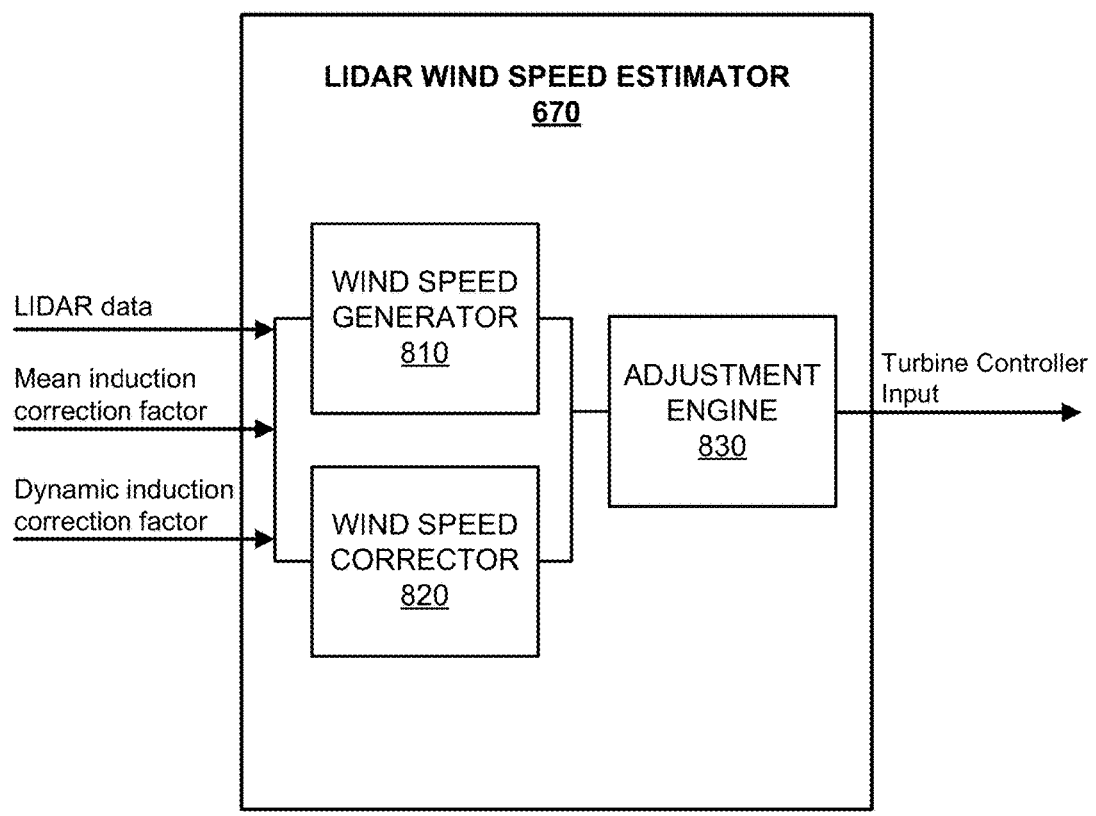
FIG. 8 illustrates an example implementation of the LIDAR wind speed estimator of the example of FIGS. 6A-6C.

FIG. 8 illustrates an example implementation of the LIDAR wind speed estimator 670. The estimator 670 receives LIDAR data (e.g., LIDAR sensor data 510 and/or LIDAR wind estimator 610 initial output), along with mean induction and dynamic induction information, for example. In certain examples, the estimator 670 receives mean and dynamic induction correction factors from the generators 650, 660 (e.g., as shown in the example of FIG. 6A). In other examples, the estimator 670 receives mean and dynamic induction models from which correction factors can be generated and applied to LIDAR wind data by the estimator 670. As shown in the example of FIG. 8, the estimator 670 includes a wind speed generator 810, a wind speed corrector 820, and an adjustment engine 830.

If the estimator 670 receives wind information from the LIDAR wind estimator 610 (e.g., FIG. 6A), then the wind speed generator 810 accepts that information to form the wind speed estimation. If, however, the estimator 670 does not receive an initial wind estimate from the LIDAR wind estimator 610 (e.g., FIGS. 6B-6C), then the wind speed generator 810 uses the LIDAR sensor data 510 to generate an estimation.

The wind speed corrector 820 applies the mean and dynamic induction corrections to the wind speed estimation (e.g., to modify the initial wind estimate and/or to generate a more accurate estimate based on sensor data 510 and induction correction), for example. In certain examples, the wind speed corrector 820 receives mean and dynamic induction correction factors (e.g., FIG. 6A) to be applied to the wind speed estimate. In other examples, the wind speed corrector 820 receives mean and dynamic induction models (e.g., FIGS. 6B-6C) and processes the models (e.g., as the correction generators 650, 660 otherwise would) to modify the wind speed estimate. The adjustment engine 830 generates one or more turbine controller inputs (e.g., rotor effective wind speed, rotor effective wind direction, rotor effective shear, etc.) corrected for mean and dynamic induction effects, for example.

While example implementations of the infrastructures 100, 500, and their components are illustrated in FIGS. 1-8, one or more of the elements, processes and/or devices illustrated in FIGS. 1-8 may be combined, divided, re-arranged, omitted, eliminated and/or implemented in any other way. Further, the example wind estimation processor 530, wind turbine controller 540, their components, and/or, more generally, the example systems 100, and/or 500 of FIGS. 1-8 may be implemented by hardware, software, firmware and/or any combination of hardware, software and/or firmware. Thus, for example, any of the example wind estimation processor 530, wind turbine controller 540, their components, and/or, more generally, the example systems 100, and/or 500 of FIGS. 1-8 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wind estimation processor 530, wind turbine controller 540, their components, and/or, more generally, the example systems 100, and/or 500 of FIGS. 1-8 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-8 may include one or more elements, processes and/or devices in addition to, or instead of, those illustrated in FIGS. 1-8, and/or may include more than one of any or all of the illustrated elements, processes and devices.

Flowcharts representative of example machine readable instructions for implementing the systems 100, and/or 500 of FIGS. 1-8 are shown in FIGS. 9-13. In these examples, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example programs are described with reference to the flowcharts illustrated in FIGS. 9-13, many other methods of implementing the example systems 100, and/or 500 may alternatively be used. For example, the order of execution of the blocks may be changed, and/or some of the blocks described may be changed, eliminated, or combined.

As mentioned above, the example processes of FIGS. 9-13 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
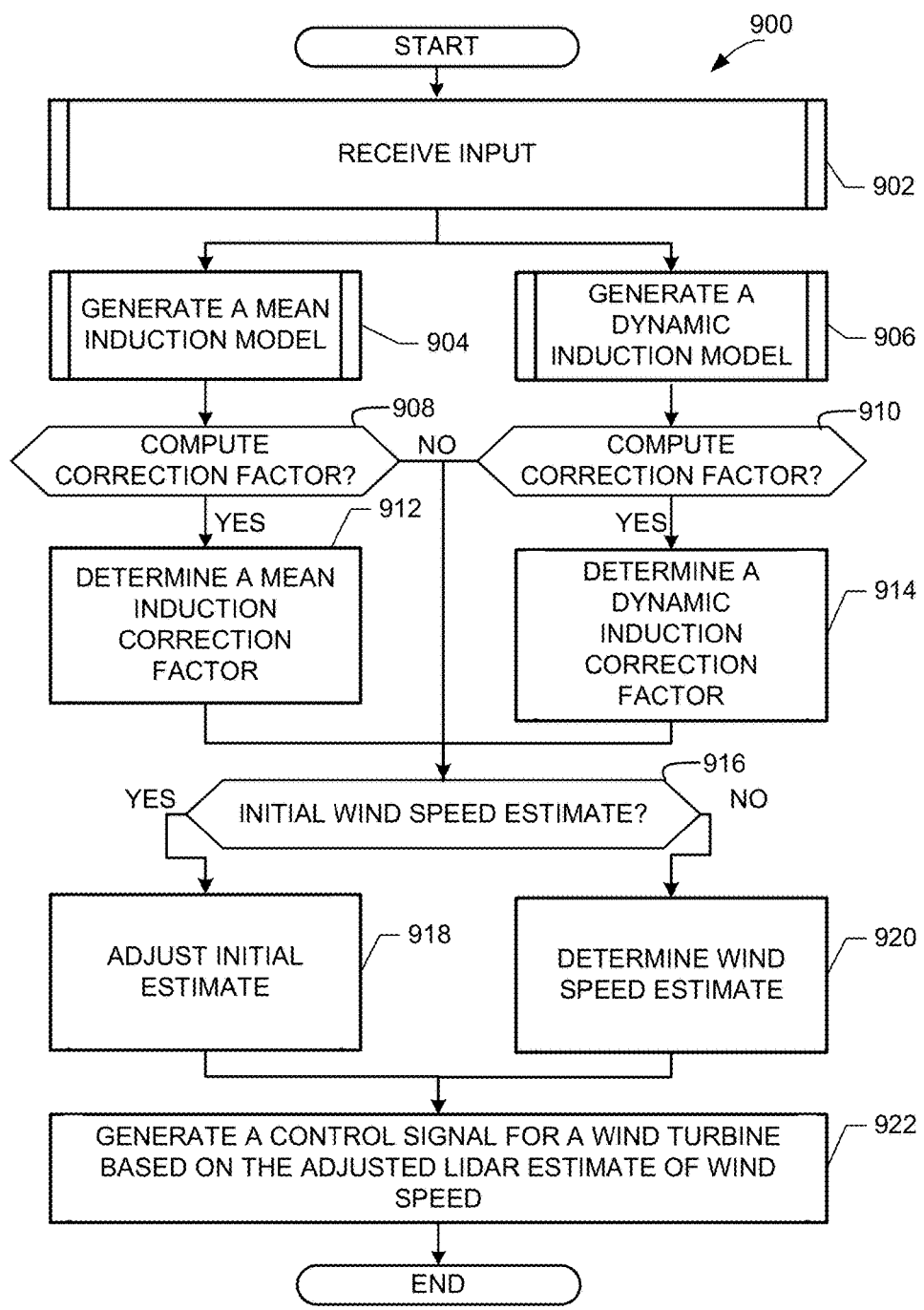
FIGS. 9-13 are flow charts representative of example machine readable instructions that may be executed to implement the example systems of FIGS. 1-8.

The program 900 of FIG. 9 begins at block 902 at which input is received. The input can include LIDAR sensor data 510, turbine operating data 520, etc., received by the LIDAR wind estimator 610, the model based processor 620, etc. The input can be processed to generate different and/or additional information (e.g., to use the operating data 520 to generate one or more estimated turbine output parameters, use the sensor data 510 to form an initial estimate of wind speed, etc.) and/or can be stored and/or forwarded for use in adjusting an estimated wind signal (e.g., for an apriori induction correction, etc.), for example.

At block 904, a mean induction model is generated. For example, based on the input and/or information generated from the input (e.g., modeled turbine output parameters such as generator speed, power, rotor thrust, torque, blade pitch, etc.), a model describing a static or mean induction or inflow effect on turbine air flow is generated. As described above in connection with Equations 2 and 3, mean induction can be modeled using a model such as an actuator disk model to relate rotor average induction to thrust.

At block 906, a dynamic induction model is generated. For example, based on the input and/or information generated from the input (e.g., modeled turbine output parameters such as generator speed, power, rotor thrust, torque, blade pitch, etc.), a model describing a delayed or dynamic induction or inflow effect on turbine air flow is generated. As described above in connection with Equations 6, 7, and 8, dynamic induction can be modeled using a model such as an actuator disk model to relate rotor average induction to thrust.

At block 908, configuration information is evaluated to determine whether or not a mean correction factor is to be computed. For example, the configuration and/or instruction for the wind estimation processor 530 is evaluated to determine whether or not the mean induction correction generator 650 is to be used to process the mean induction model and generate a mean induction correction factor.

At block 910, configuration information is evaluated to determine whether or not a dynamic correction factor is to be computed. For example, the configuration and/or instruction for the wind estimation processor 530 is evaluated to determine whether or not the dynamic induction correction generator 660 is to be used to process the dynamic induction model and generate a dynamic induction correction factor.

If the mean correction factor is to be generated, then, at block 912, the mean induction correction factor is determined. For example, the mean induction model from the mean induction model builder 630 is used alone or in conjunction with information from the model based processor 620 by the mean induction correction generator 650 to generate a mean induction corrector factor to be applied to a LIDAR wind speed estimate.

For example, Equations 4 and/or 5, described above, illustrate how the mean induction model can be used to formulate a correction factor for mean induction with respect to a LIDAR estimate of wind speed (e.g., as part of a flow model). Thus, sensor information (e.g., blade pitch angle, rotor speed, power output, torque, etc.) and/or model information can be used with a low-pass filter, estimated wind speed, rotor radius, air density, thrust coefficient, and/or estimated mean thrust, etc., to compute a mean induction correction factor based on Equations 2 and 3 to be applied per Equations 4 and 5. Mean induction can be deduced from thrust and/or other turbine parameter as a function of wind speed, for example.

If the dynamic correction factor is to be generated, then, at block 914, the dynamic induction correction factor is determined. For example, the dynamic induction model from the dynamic induction model builder 640 is used alone or in conjunction with information from the model based processor 620 by the dynamic induction correction generator 660 to generate a dynamic induction corrector factor to be applied to a LIDAR wind speed estimate.

For example, Equations 9 and/or 10, described above, illustrate how the dynamic induction model can be used to formulate a correction factor for dynamic induction with respect to the LIDAR estimate of wind speed (e.g., as part of a flow model). Thus, sensor information (e.g., blade pitch angle, rotor speed, power output, torque, etc.) and/or model information can be used with a low-pass filter (e.g., to remove noise), thrust coefficient (e.g., computed from model-based thrust, etc.), rotor scaling constant, and/or wind speed scaling constant, etc., to compute a dynamic induction correction factor based on Equations 6-8 to be applied per Equations 9 and 10. Dynamic induction can be deduced from thrust and/or other turbine parameter as a function of wind speed, for example. The dynamic induction model can be integrated by the dynamic induction correction generator 640 to compute the delayed or dynamic induction correction factor.

Thus, the mean and dynamic induction correction factors can be generated based on one or more simplifications of wind field behavior/characteristic. For example, an average induced flow over a radius r (e.g., taken alone and/or weighted according to a shape factor, etc.) and a low-pass filtered and/or time-averaged induced wind field (e.g., over a given period of time and/or for given wind turbine operating conditions, etc.) can be determined and used to affect a LIDAR estimate of wind speed with respect to the turbine 100.

At block 916, information is evaluated to determine whether or not an initial wind speed estimate has been determined. For example, at block 902, the LIDAR wind estimator 610 can generate an initial wind estimate and/or an initial wind estimate can otherwise be input into the wind estimation processor 530.

If an initial wind speed estimate has been determined, then, at block 918, the mean and dynamic induction information (e.g., mean and dynamic induction models and, available, mean and dynamic induction correction factors) is used to adjust the initial wind speed estimate (e.g., account for mean and dynamic induction effects in the LIDAR wind speed measurement to provide a more accurate estimate for feedforward turbine control, etc.).

For example, the LIDAR wind speed estimator 670 estimates wind speed based on an output from the LIDAR wind estimator 610 adjusted by the mean induction correction factor and the dynamic induction correction factor. For example, Equations 5 and 10 can be applied to adjust the LIDAR estimate according to the mean and dynamic induction factors. The LIDAR wind speed estimate can be based on an initial wind parameter estimate (e.g., from the LIDAR wind estimator 610) adjusted by calculated mean wind speed variation.

If no initial wind speed estimate has been determined, then, at block 920, a wind speed estimate is calculated. For example, the LIDAR wind speed estimator 670 uses the mean induction model and the dynamic induction model (e.g., provided by the mean induction model builder 630 and the dynamic induction model builder 640, etc.) in conjunction with the LIDAR sensor data 510 to determine and correct an estimate of wind speed, etc., to be provided to the wind turbine controller 540.

Thus, the LIDAR wind speed estimator 670 can utilize mean and dynamic induction information to correct an initial wind estimate and/or to generate a more accurate wind estimate from LIDAR sensor data 510 and turbine operating data 520.

At block 922, a control signal for the wind turbine 100 is generated based on the wind estimate information. For example, the LIDAR wind speed estimator 670 outputs a rotor effective wind speed for use by the wind turbine controller 540 to control operation of the wind turbine 100. In certain examples, the wind speed estimator 670 can also output one or more other wind turbine control parameters including rotor effective wind direction, rotor effective wind shear, etc., to be provided to the wind turbine controller 540. Thus, both static and dynamic deceleration caused by wind can be modeled and accounted for to better control the turbine 100, for example.

The turbine control parameters (e.g., input to the controller 130, 540) are determined a priori, rather than a posteriori to provide feedforward control of the wind turbine 100 accounting for both mean and dynamic induction effects. For feedforward control, an incoming wind signal is estimated in advance for real time and/or substantially real time (e.g., accounting for some processing and/or transmission delay) adjustment of turbine 100 control. Processing after the fact can result in lost benefit from outdated information. Feedforward induction processing and correction apriori can correct for induction effect(s) and improve (e.g., correct and/or otherwise increase) preview time for improved accuracy of wind measurement and turbine control, for example. Apriori induction correction using model(s) for induction (e.g., the mean induction model and the dynamic induction model) differs from cross-correlation methods for wind speed adjustment. A cross-correlation method between observed lidar estimated wind speed and turbine operating data such as wind speed can establish a) a correlation coefficient, which measures "goodness" or appropriateness of a comparison between the lidar estimate and turbine operating data; and b) a correlation time delay between the lidar estimate and turbine operating data. The correlation coefficient and correlation time delay can be used to form a correction that can be applied onto the lidar scale or a time delay to compensate for an observed difference. The basis of cross-correlation methods implies an a-posteriori approach with the use of an analysis time window in which different correlations are computed and averaged. Such time windows can range from several minutes up to 10 s. A long time window will increase the statistical accuracy of the cross-correlation analysis, and a short time window will result in a statistically uncertain estimate.

However, a posteriori cross-correlation method using past data is of less value than a model based induction method in order to derive a correction for a variable (e.g., wind speed, wind direction, wind shear, etc.) to be used for feed-forward control. Indeed, dynamic effects, such as a pitch of blades, start to affect induction instantaneously, and this induction effect can be detected instantaneously with an induction model that knows blade pitch. On the contrary, however, this effect does not start to influence parameters of a cross-correlation method until a time period has lapsed, typically half of the averaging time window, which can introduce an unwanted and uncontrolled delay in any correction applied using such cross correlation method. Additionally, while a correlation method can adjust preview time, the model-based approach can correct LIDAR data values, thereby providing more accurate data as well as corrected preview time and improved turbine operating control and performance.

Figure 10:
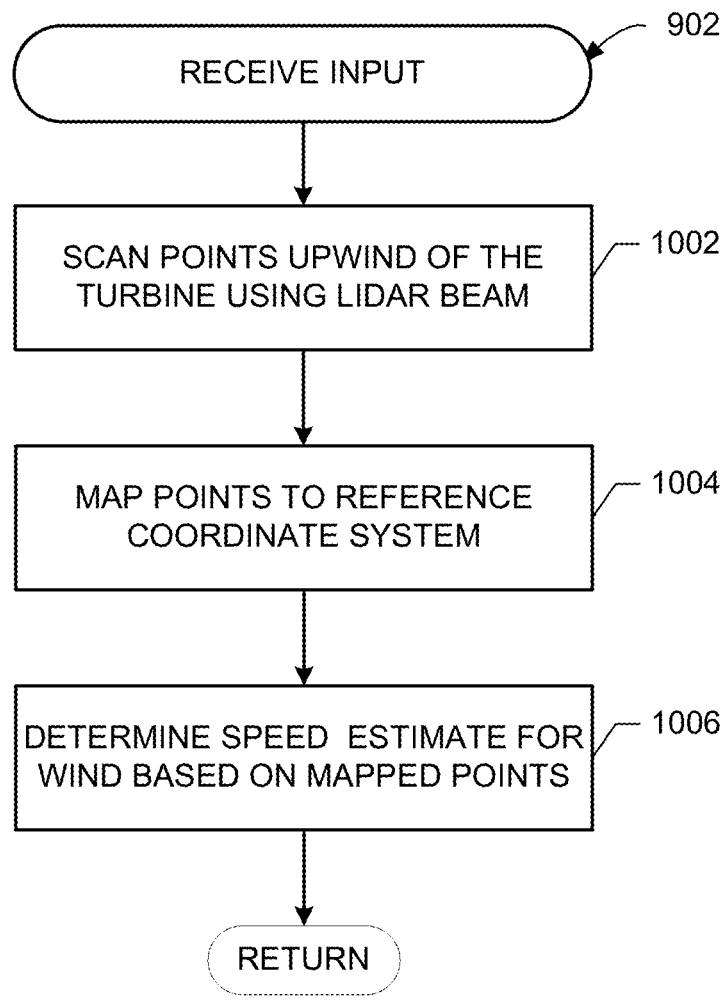

Additional detail associated with receiving input (block 902) is shown in the example of FIG. 10. At block 1002, a LIDAR beam from a LIDAR sensor 420 (e.g., a pulsed or continuous wave Doppler LIDAR sensor, etc.) mounted on or near the turbine 100 is used to scan points upwind of the turbine 100.

At block 1004, scanned points are mapped to a reference coordinate system. For example, points/locations in a wind field scanned by the LIDAR sensor 420 are mapped to a reference coordinate system (e.g., x-y coordinate, x-y-z coordinate, polar coordinate, etc.). By mapping points to coordinates within a defined reference coordinate system, locations and relationships between the points can be quantified and analyzed.

At block 1006, a speed or velocity estimate is determined for the wind based on the mapped points. For example, the LIDAR wind estimator 610 can process a sequence of mapped points over time to measure distance traveled per unit of time in the reference coordinate system. Such distance over time can be used to determine a wind speed estimate (and velocity if direction is analyzed based on the coordinates as well).

Figure 11:
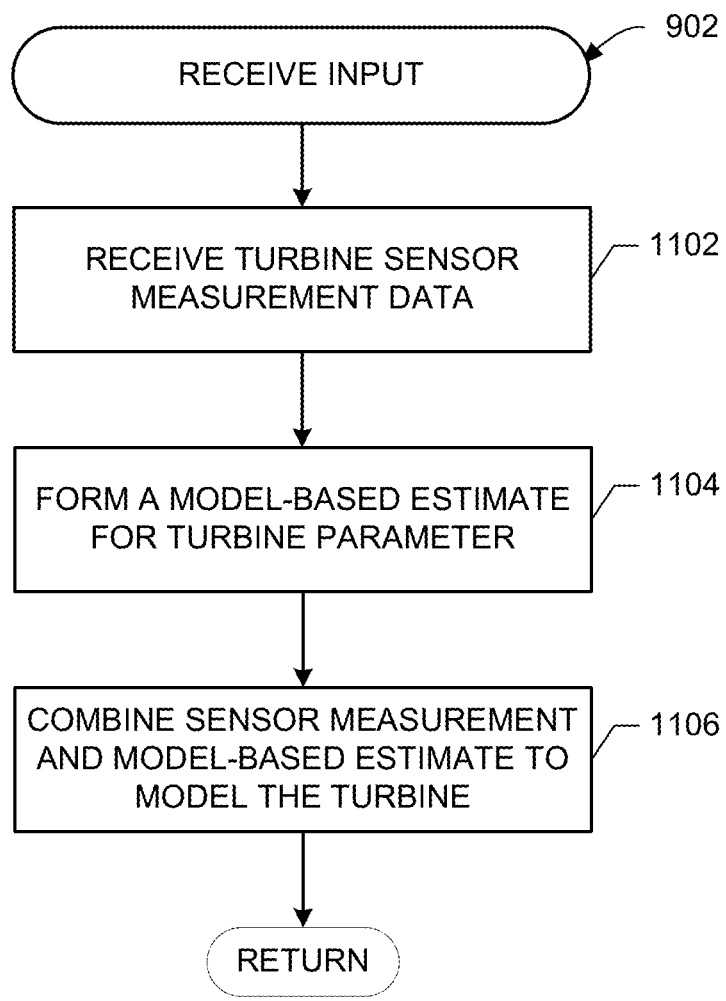

Additional detail associated with receiving input (block 902) is shown in the example of FIG. 11. At block 1102, turbine sensor measurement is received. For example, rotor aerodynamic thrust can be estimated from turbine operating data. For example, at a given time, a value of aerodynamic thrust, T, can be derived from strain gauge measurements located in the tower 116 and/or blades 114 of the example turbine 100.

At block 1104, a model-based estimate is formed for a turbine operating parameter. For example, the model based processor 620 can generate a model based estimation of thrust and/or other parameter based on measured and/or modeled rotor speed, generator torque, blade pitch angle, etc. (see, e.g., Equation 1 above).

At block 1106, the turbine sensor measurement and model-based estimate are combined to form a model of the turbine 100. Thus, the model based processor 620 uses the input information 520 and/or other information regarding turbine 100 components, operation, operating conditions, etc., to estimate/model turbine output parameter(s), for example.

Thus, in certain examples, the model-based processor 620 processes turbine operating data 520 to estimate turbine output parameters such as generator speed, power, rotor thrust, torque, blade pitch, etc. The model-based processor 620 provides accurate turbine condition information relying on models and/or sensed (e.g., measured) parameters.

Figure 12:
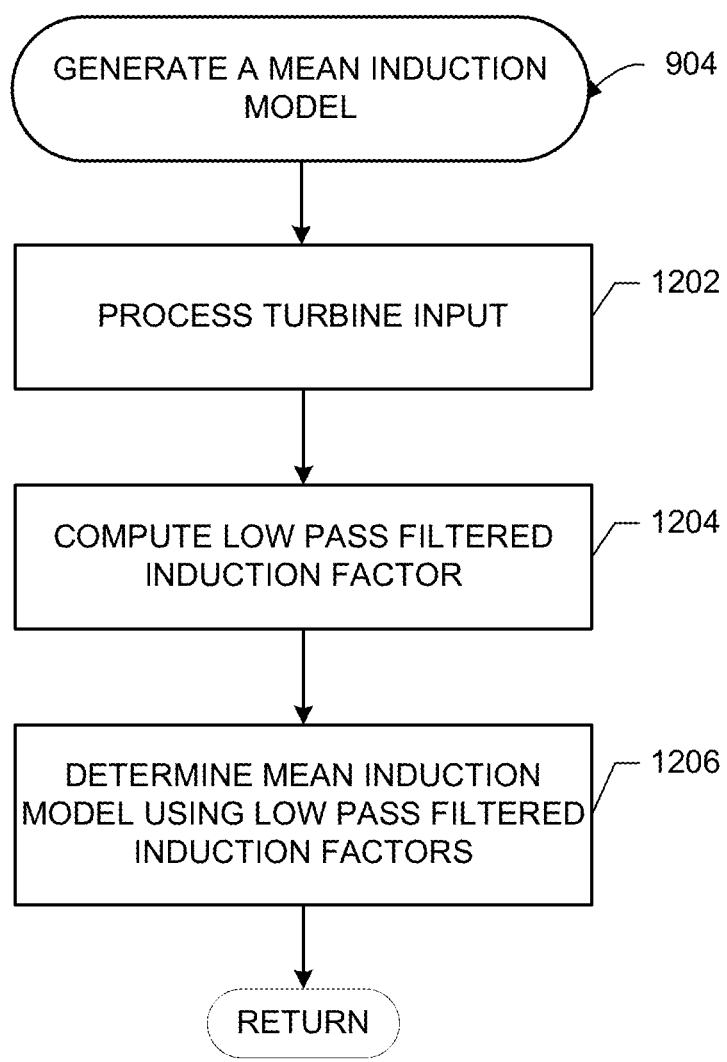

Additional detail associated with generating a mean induction model (block 904) is shown in the example of FIG. 12. At block 1202, turbine input (e.g., turbine operating data 520) is processed (e.g., by the model based processor 620 and/or by the mean induction model builder 630). For example, turbine operating data, such as rotor aerodynamic thrust coefficient, $C_T$, can be used to form an aerodynamic model, such as an actuator disk model and/or other model based on a blade element momentum theory, etc., to estimate, at a given time, induction under quasi-steady flow assumption. Average (e.g., low pass filtered) estimates can be determined for the thrust coefficient $C_T$. The averaging time can range from 20 seconds to several minutes, which dictates a type of parameter(s) used for filtering.

At block 1204, a low pass filtered variable is generated for one or more variables via a low pass filtering of rotor estimated wind information. For example, a low pass filtered thrust can be generated from wind thrust observations/measurements. Similarly, blade pitch angle can be low pass filtered.

At block 1206, a mean induction model can be determined from the low pass filtered induction factors. For example, as shown in Equation 2, a mean induction model (e.g., an actuator disk model) can be estimated from low pass filtered thrust. For example, the actuator disk model can be used to relate a rotor average induction factor to thrust $C_T$ per Equations 2 and 3. The mean induction model represents a wind field model accounting for a mean induction effect, for example.

In certain examples, the LIDAR wind speed estimator 670 and/or the mean induction correction generator 650 uses the mean induction model to generate a mean induction corrector factor to be applied to a LIDAR estimate. For example, Equations 4 and/or 5, described above, illustrate how the mean induction model can be used to formulate a correction factor for mean induction with respect to a LIDAR estimate of wind speed (e.g., as part of a flow model). Thus, sensor information (e.g., blade pitch angle, rotor speed, power output, torque, etc.) and/or model information can be used with a low-pass filter, estimated wind speed, rotor radius, air density, thrust coefficient, and/or estimated mean thrust, etc., to compute a mean induction correction factor based on Equations 2 and 3 to be applied per Equations 4 and 5. Mean induction can be deduced from thrust and/or other turbine parameter as a function of wind speed, for example.

Figure 13:
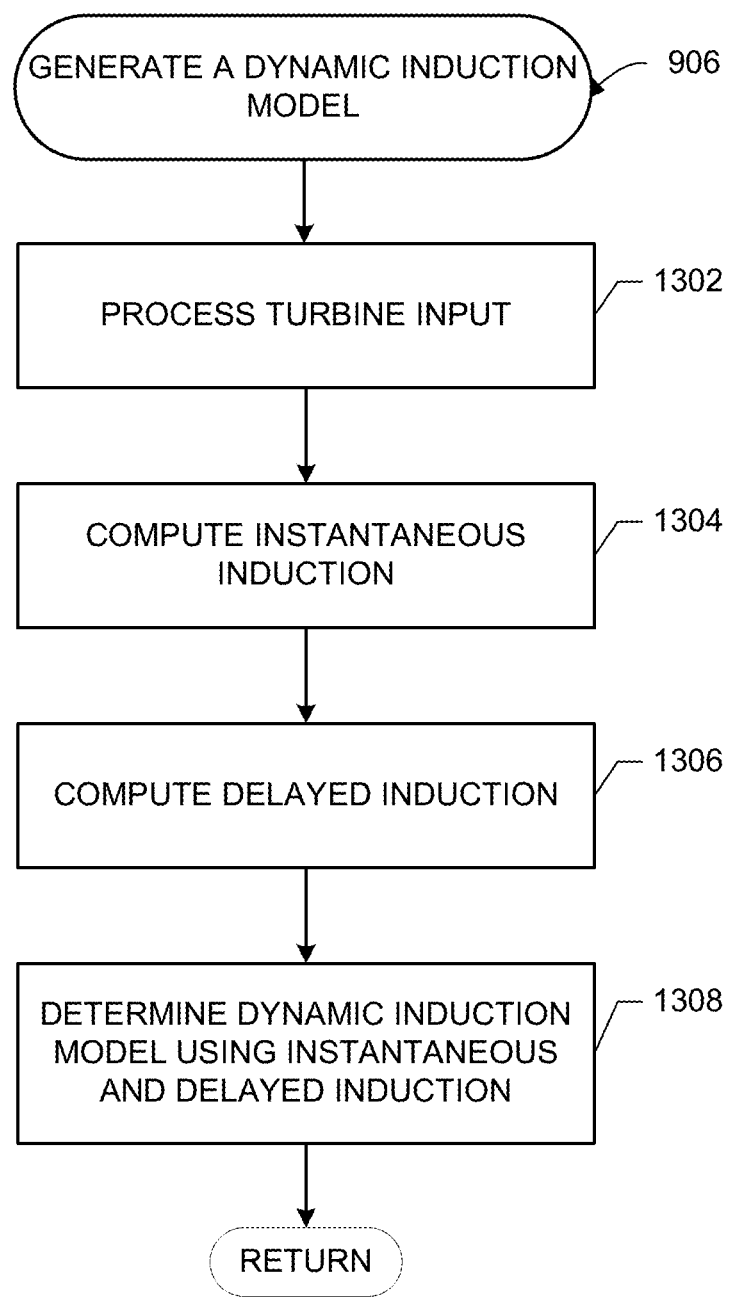

Additional detail associated with determining a dynamic induction model (block 906) is shown in the example of FIG. 13. At block 1302, turbine input (e.g., turbine operating data 520) is processed (e.g., by the model based processor 620 and/or by the dynamic induction model builder 640). For example, turbine operating data, such as rotor aerodynamic thrust coefficient, $C_T$, can be used to form an aerodynamic model, such as an actuator disk model and/or other model based on a blade element or rotor momentum theory, etc., to estimate, at a given time, induction under quasi-steady flow assumption.

At block 1304, an instantaneous or quasi-steady induction estimate is computed. For example, as described above in connection with Equations 6 and 7, $C_T$ can be used to estimate an instantaneous or quasi-steady induction.

At block 1306, a delayed induction estimate is computed. For example, as described above in connection with Equation 8, a dynamic induction effect after an elapsed time delay can be determined to account for a wake convecting downstream.

At block 1308, both instantaneous and delayed induction estimates are used to determine a dynamic induction model. Thus, instantaneous or "quasi-steady" induction effect and delayed wake induction effect can be used to form a more complete dynamic induction model to correct a LIDAR wind parameter estimate. The dynamic induction model represents a wind field model accounting for a dynamic induction effect, for example.

In certain examples, the LIDAR wind speed estimator 670 and/or the dynamic induction correction generator 650 uses the dynamic induction model to generate a dynamic induction corrector factor to be applied to a LIDAR estimate. For example, Equations 9 and/or 10, described above, illustrate how the dynamic induction model can be used to formulate a correction factor for dynamic induction with respect to the LIDAR estimate of wind speed (e.g., as part of a flow model). Thus, sensor information (e.g., blade pitch angle, rotor speed, power output, torque, etc.) and/or model information can be used with a low-pass filter (e.g., to remove noise), thrust coefficient (e.g., computed from model-based thrust, etc.), rotor scaling constant, and/or wind speed scaling constant, etc., to compute a dynamic induction correction factor based on Equations 6-8 to be applied per Equations 9 and 10. Dynamic induction can be deduced from thrust and/or other turbine parameter as a function of wind speed, for example. The dynamic induction model can be integrated by the dynamic induction correction generator 640 to compute the delayed or dynamic induction correction factor.

Thus, certain examples provide apriori induction correction for wind turbine operating conditions with respect to LIDAR wind data based on turbine operating data. Certain examples enable improved feedforward turbine control using models to correct LIDAR data, rather than side-effects of the LIDAR data, which results in more accurate data, improved preview time, and better turbine operation.

Figure 14:
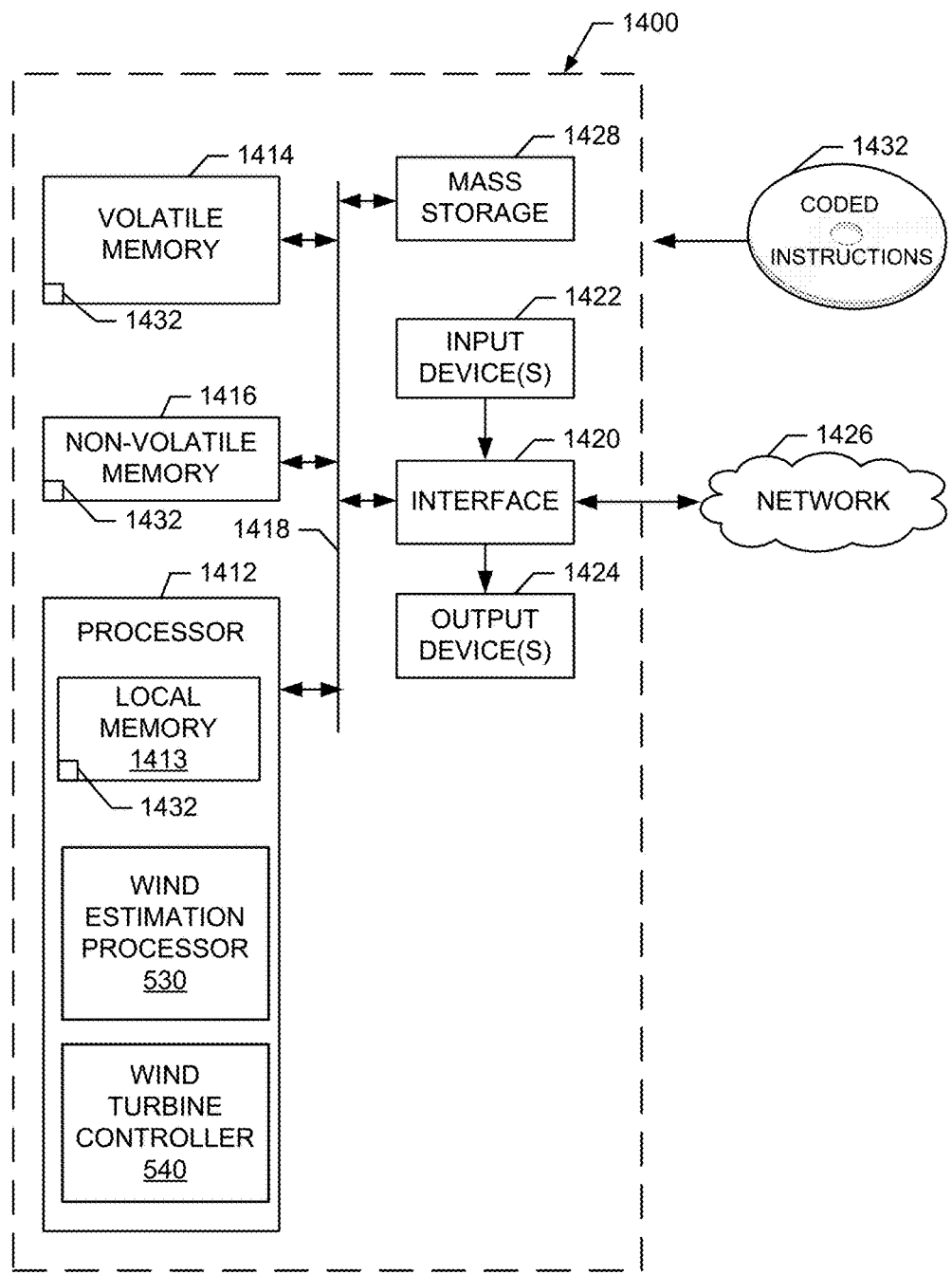
FIG. 14 is a schematic illustration of an example processor platform that may execute the instructions of FIG. 9-13 to implement the example systems of FIGS. 1-8.

FIG. 14 is a block diagram of an example processor platform 1400 capable of executing the instructions of FIG. 9-13 to implement the systems of FIGS. 1-8. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a peripheral component interconnect (PCI) express interface.

In the illustrated example, one or more input devices 1422 are connected to the interface circuit 1420. The input device(s) 1422 permit(s) a user to enter data and commands into the processor 1412. The input device(s) 1422 can be implemented by, for example, an audio sensor, a microphone, a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9-13 may be stored in the mass storage device 1428, in the volatile memory 1414, in the non-volatile memory 1416, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of controlling a wind turbine, the method comprising:
   receiving wind speed data from a Light Detecting and Ranging (LIDAR) sensor;
   receiving operating data indicative of wind turbine operation;
   determining an apriori induction correction for wind turbine operating conditions with respect to the LIDAR wind speed data based on the operating data, wherein the apriori induction correction includes determining a mean induction model and a delayed dynamic induction model based on the operating data indicative of wind turbine operation;
   estimating a wind signal from the LIDAR sensor that is adjusted by the apriori induction correction; and
   generating a control signal for the wind turbine based on the adjusted LIDAR estimated wind signal.

2. The method of claim 1, wherein the operating data indicative of wind turbine operation includes a measurement or a model-based estimate of at least one of turbine thrust, turbine speed, turbine torque, turbine yaw, position, or turbine blade pitch.

3. The method of claim 1, wherein a wind field model quantifying at least one of a mean induction effect and a dynamic induction effect is used to estimate the wind signal from the LIDAR sensor.

4. The method of claim 3, wherein the mean induction model includes determining a mean induction factor using a low pass filter on the operating data indicative of wind turbine operation to generate a wind field model quantifying the mean induction effect.

5. The method of claim 3, wherein the dynamic induction model includes determining a dynamic induction factor using the operating data indicative of wind turbine operation to generate a wind field model quantifying the dynamic induction effect.

6. The method of claim 1, wherein the control signal is configured to control the wind turbine based on at least one of: a) a rotor effective wind speed corrected for turbine operation effects, b) a rotor effective wind direction corrected for turbine operation effects, c) and a rotor effective shear corrected for turbine operation effects.

7. The method of claim 6, wherein the control signal is configured to continuously adjust operation of the wind turbine including at least one of blade pitch, yaw, torque, turbine set-point, or turbine operating constraint via the control signal.

8. A tangible, computer-readable storage medium including instructions which, when executed by a processor, cause the processor to at least:
   receive wind speed data from a Light Detecting and Ranging (LIDAR) sensor;
   receive operating data indicative of wind turbine operation;
   determine an apriori induction correction for wind turbine operating conditions with respect to the LIDAR wind speed data based on the operating data, wherein the apriori induction correction includes determining a mean induction model and a delayed dynamic induction model based on the operating data indicative of wind turbine operation;
   estimate a wind signal from the LIDAR sensor that is adjusted by the apriori induction correction; and
   generate a control signal for a wind turbine based on the adjusted LIDAR estimated wind signal.

9. The computer-readable storage medium of claim 8, wherein the operating data indicative of wind turbine operation includes a measurement or a model-based estimate of at least one of turbine thrust, turbine speed, turbine torque, turbine yaw, position, or turbine blade pitch.

10. The computer-readable storage medium of claim 8, wherein a wind field model quantifying at least one of a mean induction effect and a dynamic induction effect is used to estimate the wind signal from the LIDAR sensor.

11. The computer-readable storage medium of claim 10, wherein the mean induction model includes determining a mean induction factor using a low pass filter on the operating data indicative of wind turbine operation to generate a wind field model quantifying the mean induction effect.

12. The computer-readable storage medium of claim 8, wherein the dynamic induction model includes determining a dynamic induction factor using the operating data indicative of wind turbine operation to generate a wind field model quantifying the dynamic induction effect.

13. The computer-readable storage medium of claim 8, wherein the control signal is configured to control the wind turbine based on at least one of: a) a rotor effective wind speed corrected for turbine operation effects, b) a rotor effective wind direction corrected for turbine operation effects, c) and a rotor effective shear corrected for turbine operation effects.

14. The computer-readable storage medium of claim 13, wherein the control signal is configured to continuously adjust operation of the wind turbine including at least one of blade pitch, yaw, torque, turbine set-point, or turbine operating constraint via the control signal.

15. A wind turbine control apparatus, the apparatus comprising:
  a wind estimation processor particularly configured to:
    receive wind speed data from a Light Detecting and Ranging (LIDAR) sensor;
    receive operating data indicative of wind turbine operation;
    determine an apriori induction correction for wind turbine operating conditions with respect to the LIDAR wind speed data based on the operating data, wherein the apriori induction correction includes determining a mean induction model and a delayed dynamic induction model based on the operating data indicative of wind turbine operation;
    estimate a wind signal from the LIDAR sensor that is adjusted by the apriori induction correction; and
    generate a control signal for a wind turbine controller based on the adjusted LIDAR estimated wind signal.

16. The apparatus of claim 15, wherein the operating data indicative of wind turbine operation includes a measurement or a model-based estimate of at least one of turbine thrust, turbine speed, turbine torque, turbine yaw, position, or turbine blade pitch.

17. The apparatus of claim 15, wherein the control signal is configured to control the wind turbine based on at least one of: a) a rotor effective wind speed corrected for turbine operation effects, b) a rotor effective wind direction corrected for turbine operation effects, c) and a rotor effective shear corrected for turbine operation effects.

* * * * *